United States Patent
Hotta

(10) Patent No.: US 9,863,757 B1
(45) Date of Patent: Jan. 9, 2018

(54) MEASUREMENT APPARATUS

(71) Applicant: FUJI XEROX CO., LTD., Tokyo (JP)

(72) Inventor: Hiroyuki Hotta, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/491,026

(22) Filed: Apr. 19, 2017

(30) Foreign Application Priority Data

Jul. 5, 2016 (JP) .................. 2016-133462

(51) Int. Cl.
*G01B 11/06* (2006.01)
*G02B 19/00* (2006.01)

(52) U.S. Cl.
CPC ...... *G01B 11/0608* (2013.01); *G01B 11/0691* (2013.01); *G02B 19/0009* (2013.01)

(58) Field of Classification Search
CPC ............ G01B 11/0691; G01B 11/0608; G02B 19/0009
USPC ........................................................ 356/634
See application file for complete search history.

(56) References Cited

U.S. PATENT DOCUMENTS

| | | | |
|---|---|---|---|
| 9,097,516 B2 * | 8/2015 | Hotta ..................... | G01B 11/26 |
| 2006/0033972 A1 | 2/2006 | Takemori et al. | |
| 2014/0362369 A1 * | 12/2014 | Hotta ..................... | G01B 11/26 356/138 |

FOREIGN PATENT DOCUMENTS

| | | |
|---|---|---|
| JP | 2000-063854 A | 2/2000 |
| JP | 2004-102075 A | 4/2004 |
| JP | 2005-292802 A | 10/2005 |

* cited by examiner

*Primary Examiner* — Roy M Punnoose
(74) *Attorney, Agent, or Firm* — Sughrue Mion, PLLC

(57) ABSTRACT

A measurement apparatus includes: a light emitting unit that projects irradiation light to an object; a first lens that changes a divergence degree of the irradiation light; an aperture stop unit that stops down the irradiation light projected from the first lens; a second lens that condenses the irradiation light passing through the aperture stop unit and projects the irradiation light to the object in a first direction; a transmission unit that is provided in a focal plane of the second lens and transmits therethrough a part of reflected light; a first light receiving unit that includes a light receiving surface that receives the part of the reflected light transmitted through the transmission unit; and a measurement unit that measures a height of a surface of the object by using a position of the part of the reflected light on the light receiving surface.

9 Claims, 20 Drawing Sheets

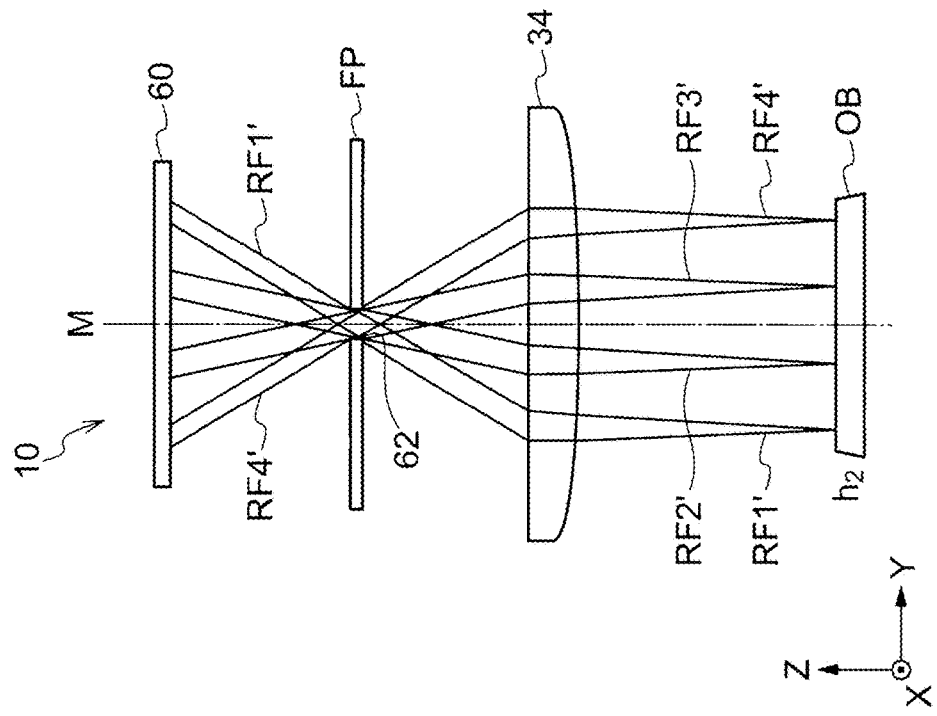
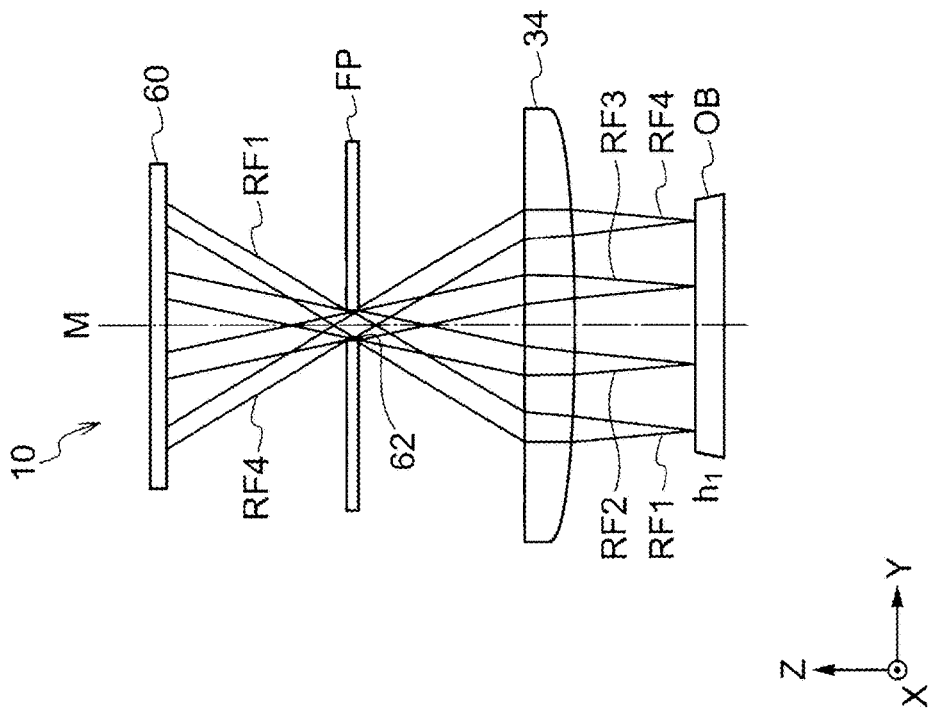

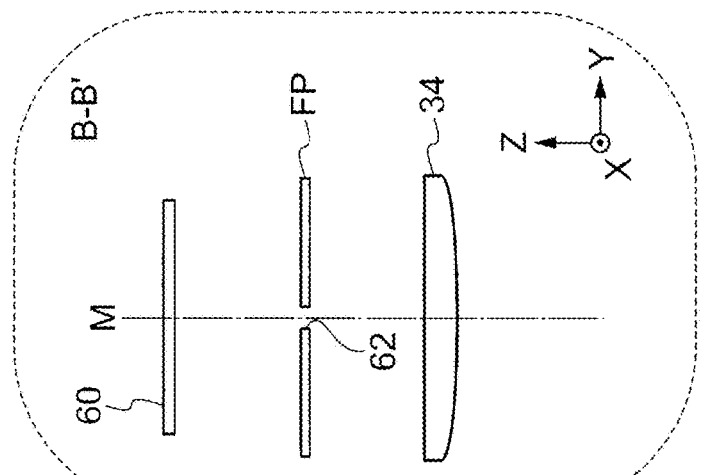
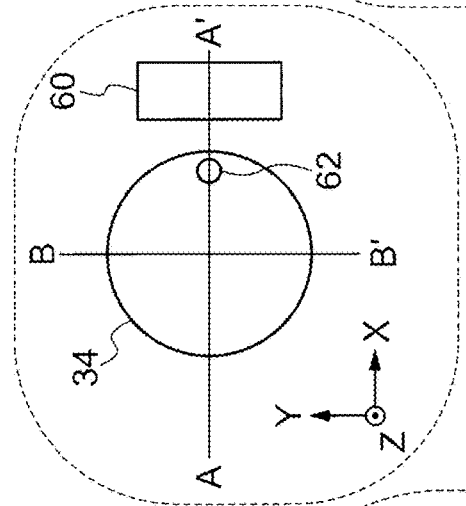
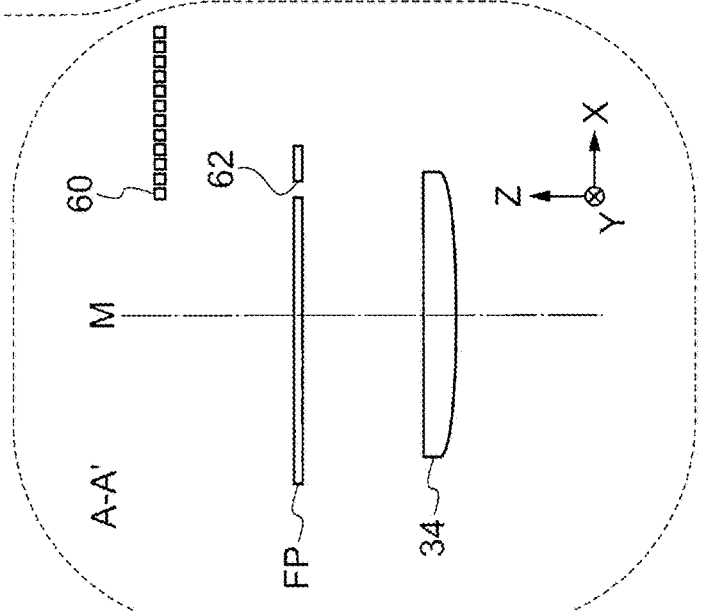

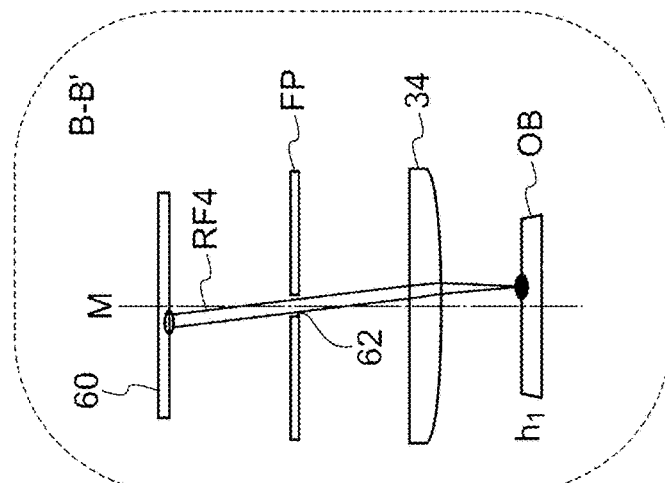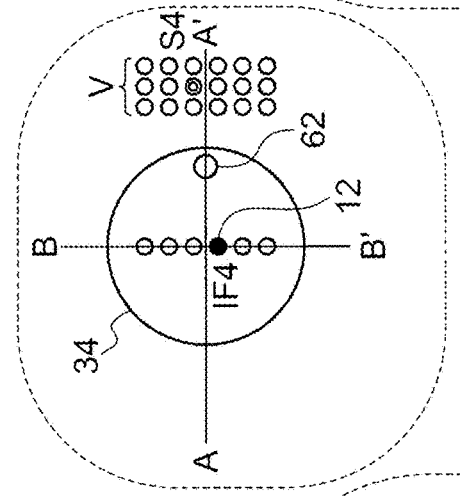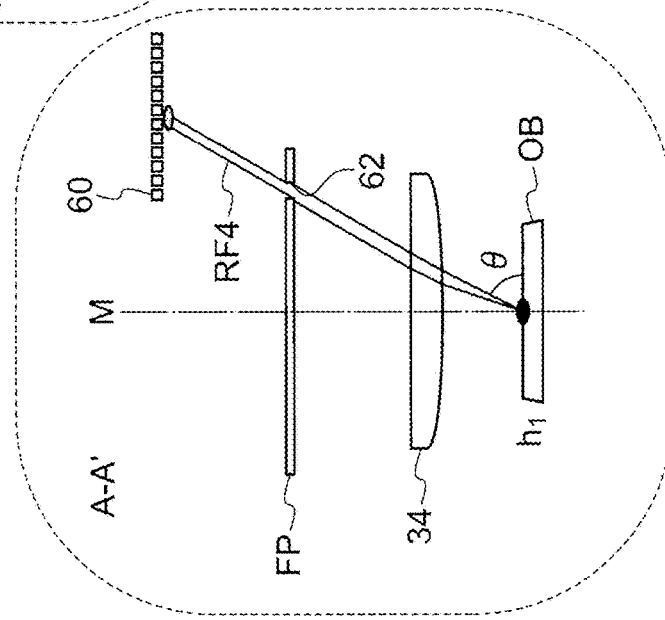

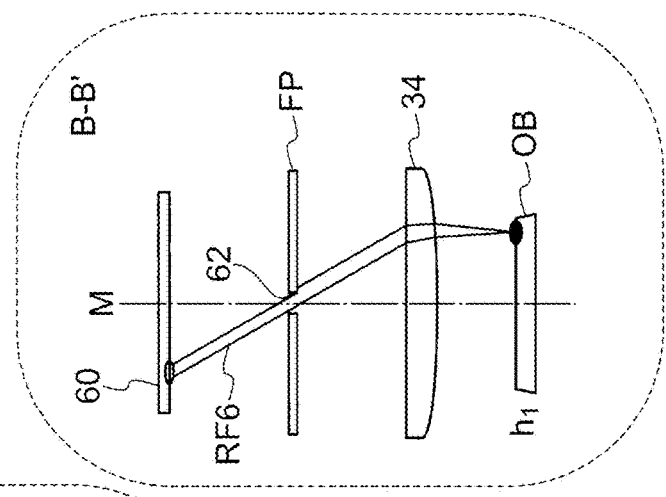
FIG.16B
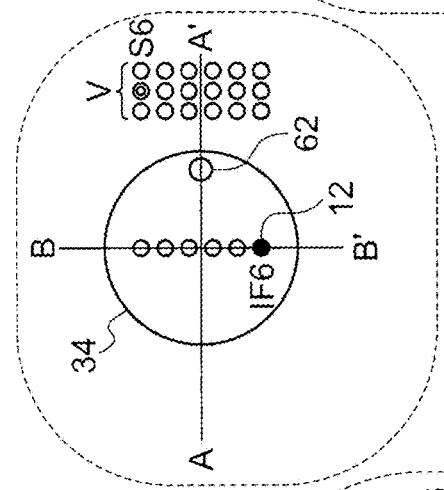
FIG.16A
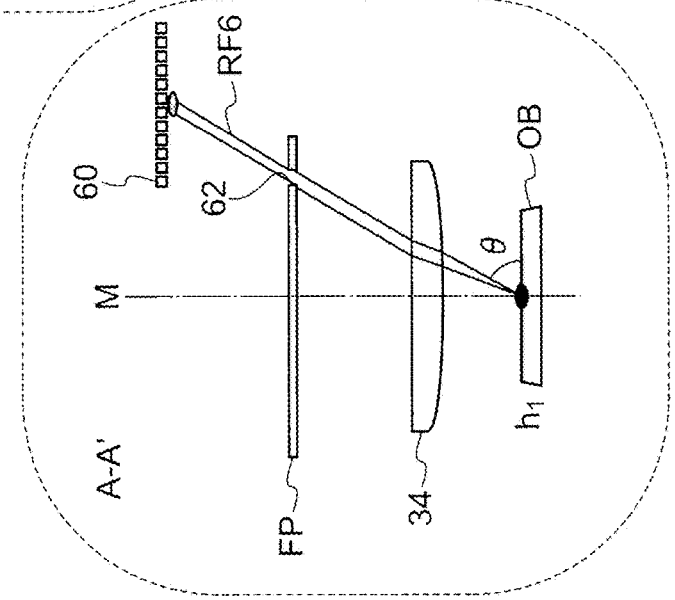

FIG.19A
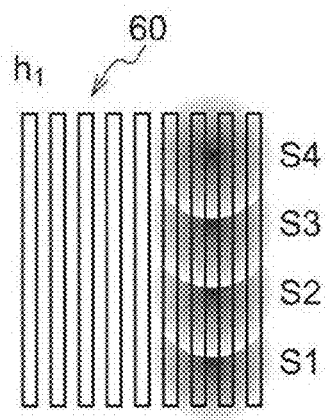
FIG.19B
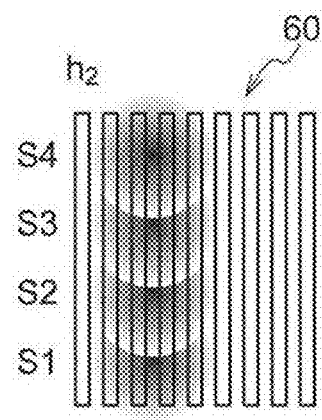
FIG.19C
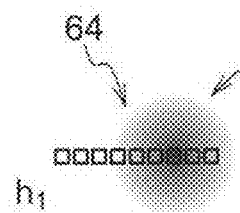
FIG.19D
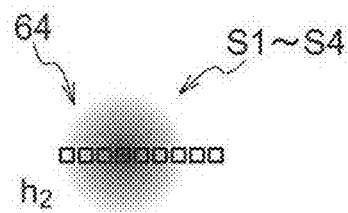
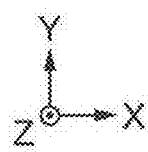

MEASUREMENT APPARATUS

CROSS-REFERENCE TO RELATED APPLICATIONS

This application is based on and claims priority under 35 USC 119 from Japanese Patent Application No. 2016-133462 filed Jul. 5, 2016.

BACKGROUND

Technical Field

The present invention relates to a measurement apparatus, and particularly, to a measurement apparatus which serves to measure a height of a surface of a measurement object.

SUMMARY

According to an aspect of the invention, a measurement apparatus includes:

a light emitting unit that projects irradiation light to an object;

a first lens that changes a divergence degree of the irradiation light emitted from the light emitting unit;

an aperture stop unit that stops down the irradiation light projected from the first lens;

a second lens that condenses the irradiation light passing through the aperture stop unit and projects the irradiation light to the object in a first direction;

a transmission unit that is provided in a focal plane of the second lens and transmits therethrough a part of reflected light, which is generated as the irradiation light is projected to the object, reflected by the object, and transmitted through the second lens;

a first light receiving unit that includes a light receiving surface that receives the part of the reflected light transmitted through the transmission unit; and a measurement unit that measures a height of a surface of the object by using a position of the part of the reflected light on the light receiving surface.

BRIEF DESCRIPTION OF THE DRAWINGS

Exemplary embodiments of the present invention will be described in detail based on the following figures, wherein:

FIGS. 9A and 9B illustrate a part of a view for explaining the operational principle of the measurement apparatus according to the exemplary embodiment;

FIGS. 10A to 10C illustrate a part of a view for explaining an operation of the measurement apparatus according to the first exemplary embodiment;

FIGS. 14A to 14C illustrate a part of a view for explaining the operation of the measurement apparatus according to the first exemplary embodiment;

FIGS. 16A to 16C illustrate a part of a view for explaining the operation of the measurement apparatus according to the first exemplary embodiment;

FIGS. 19A to 19D are views for explaining a shape of light receiving elements according to the second exemplary embodiment;

DETAILED DESCRIPTION

Hereinafter, exemplary embodiments of the present invention will be described in detail with reference to the drawings.

First Exemplary Embodiment

Figure 1:
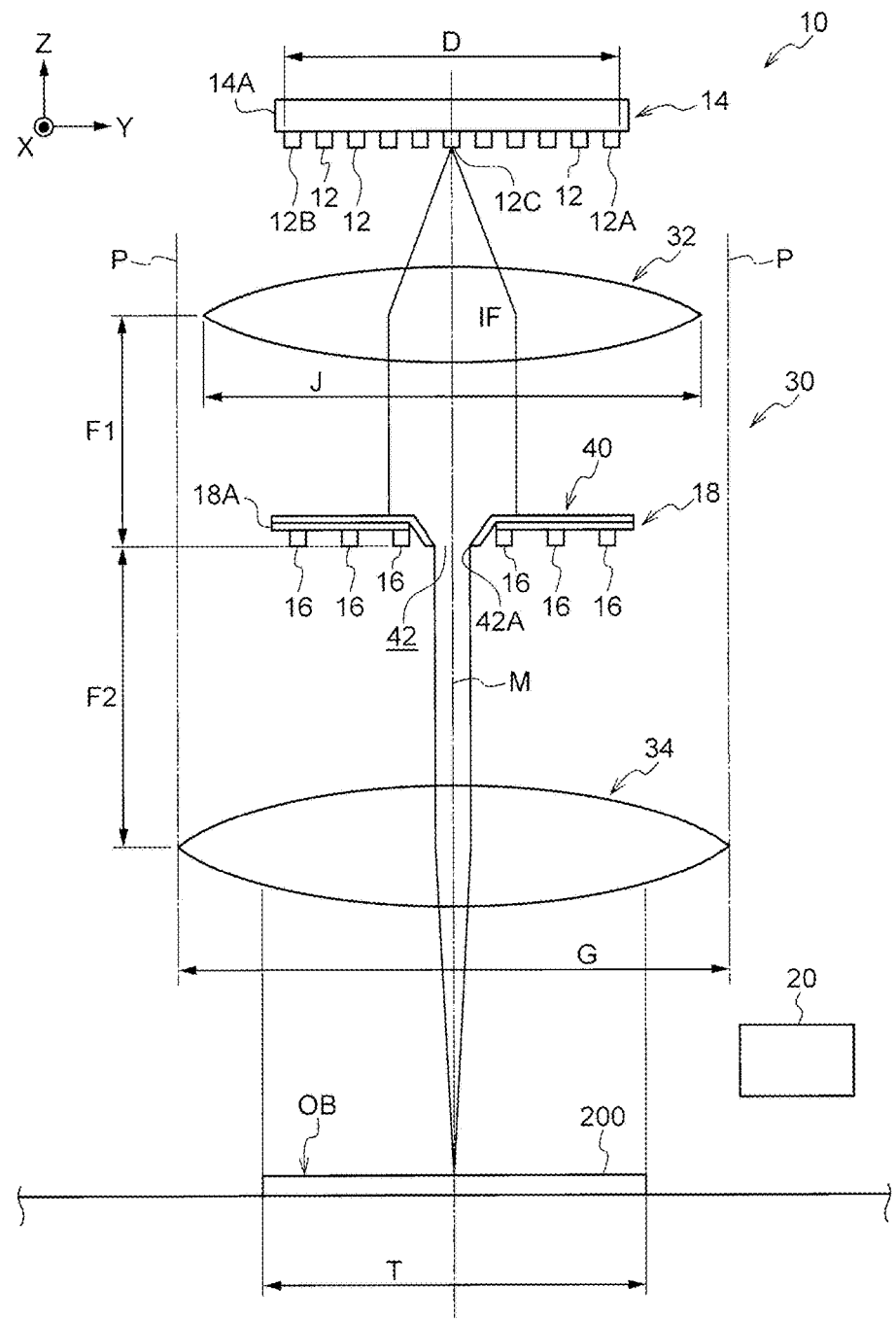
FIG. 1 is a view illustrating an example of a configuration of a measurement apparatus according to a first exemplary embodiment.
Figure 2:
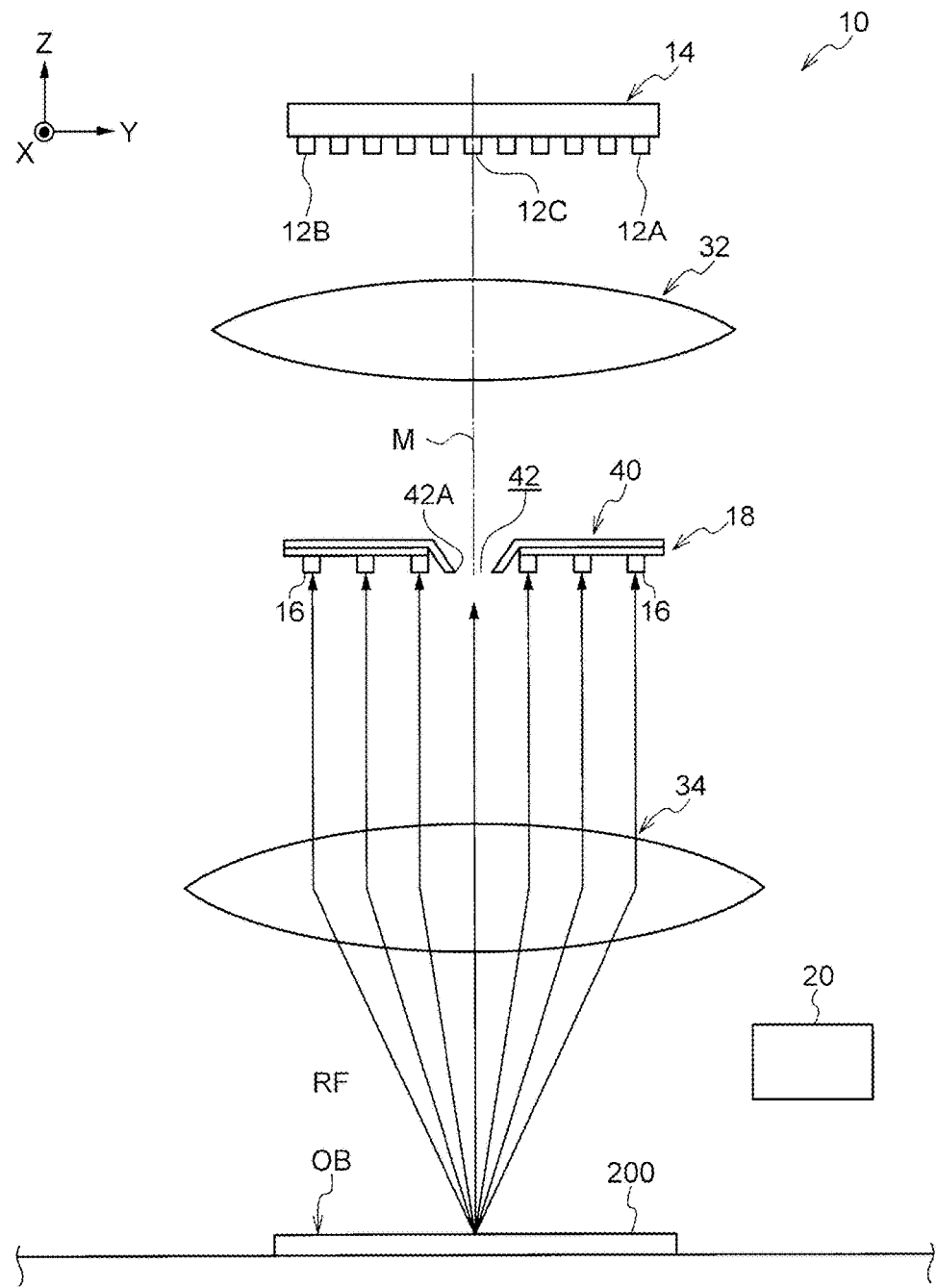
FIG. 2 is a view illustrating reflected light in the measurement apparatus according to the first exemplary embodiment.

A measurement apparatus according to the present exemplary embodiment will be described in detail with reference to FIGS. 1 to 17C. First, an example of a configuration of a measurement apparatus 10 according to the present exemplary embodiment will be described with reference to FIGS. 1 and 2. FIGS. 1 and 2 illustrate a configuration in which a measurement apparatus 10 measures an object.

As illustrated in FIG. 1, the measurement apparatus 10 includes a light emitter 14, an optical system 30, a light receiver 18, and a controller 20. The measurement apparatus sequentially projects irradiation lights in a Z-axis direction to a fine region of an object OB that moves in an −X direction, and acquires a reflection angle distribution (the reflection angle dependency of a light quantity distribution) of reflected lights with respect to irradiation lights. A measure is performed without being affected by a variation in a distance from the object OB and an angle of the object OB for a change in the shape of the object OB or a surface condition (irregularity, emboss, surface roughness, surface defect, foreign matter adhesion, or the like) is measured by using the acquired reflection angle distribution.

In more detail, as illustrated in FIG. 1, the light emitter 14 is disposed at an upper side in an up and down direction (Z-axis direction) of the apparatus with respect to a measurement region T through which the object OB moving in the −X direction passes. In addition, the light emitter 14 has plural light emitting elements 12 which are mounted side by side in a Y-axis direction on a substrate 14A, and emit light in a −Z direction as a light emitting direction. In other words, the plural light emitting elements 12 are arranged in a direction orthogonal to (intersecting) the moving direction (−X direction) of the object OB. In FIG. 1, a light emitting element 12 disposed at one end portion (right end in the drawing) in the Y-axis direction of the substrate 14A is referred to as a light emitting element 12A, a light emitting element 12 is disposed at the other end portion (left end in the drawing) in the Y-axis direction of the substrate 14A is referred to as a light emitting element 12B, and the light emitting element 12 disposed at the center of the substrate 14A is referred to as a light emitting element 12C.

The plural light emitting elements 12 according to the present exemplary embodiment are configured to sequentially emit light from the light emitting element 12A to the light emitting element 12B with a time difference, and the lights from the respective light emitting elements 12 are individually projected to different positions on the object OB, respectively. In addition, the plural light emitting elements 12 are configured such that while the object OB moves in the −X direction in the measurement region T, a cycle of light emission from the light emitting element 12A to the light emitting element 12B is repeated plural times. FIG. 1 illustrates light fluxes of an irradiation light IF when the light emitting element 12C emits light, and FIG. 2 illustrates light fluxes of the reflected light RF when the irradiation light IF emitted from the light emitting element 12C is reflected by a surface 200 of the object OB.

Although not particularly limited, for example, a vertical cavity surface emitting laser (VCSEL), a light emitting diode (LED), or the like may be used as the light emitting element 12.

The optical system 30 includes a lens 32, a lens 34, and an aperture stop 40 disposed between the lens 32 and the lens 34, and is configured as a so-called double-sided telecentric lens. The optical system 30 is disposed between the light emitter 14 and the object OB, guides the irradiation light IF emitted from a light emitting element 12 to the object OB, and guides the reflected light RF reflected by the object OB to the light receiver 18. That is, the light receiver 18 is configured to receive at least a part of the light flux of the irradiation light IF of a light emitting element 12 after the irradiation light is emitted from the lens 34, reflected by the object OB, and then transmitted through the lens 34 again. In addition, in the present exemplary embodiment, an optical axis of the lens 32 and an optical axis of the lens 34 becomes a common optical axis M, and the optical axis M runs through the center of the light emitting element 12C of the light emitter 14 and the center of an opening 42 to be described below.

As an example, the lens 32 is a convex lens having a circular shape in a top plan view, and the diameter J of the lens 32 is greater than the size D from the light emitting element 12A to the light emitting element 12B in the Y-axis direction. For this reason, almost all the lights emitted from the respective light emitting elements 12 are transmitted through the lens 32, and the lights transmitted through the lens 32 become parallel lights by changing divergence degrees thereof to be directed toward the lens 34.

As an example, the lens 34 is a convex lens having a circular shape in a top plan view, and in the present exemplary embodiment, the diameter G of the lens 34 is greater than the diameter J of the lens 32. Further, the lens 34 condenses the light fluxes emitted from the lens 32 and transmitted through the lens 34 toward the surface 200 of the object OB. A position (focal point) of a light condensing point of the lens 34 does not always have to be a position on the surface 200 of the object OB. The position of a light condensing point may be deviated (defocused) from a position on the surface 200, and an irradiation diameter of the irradiation light IF on the surface 200, that is, a size of an irradiation region of the object OB may be adjusted. The irradiation diameter according to the present exemplary embodiment is, for example, a diameter ($\varphi$) of several tens of micrometers ($\mu m$).

A substantially circular opening 42 is formed in the aperture stop 40, and a light flux emitted from the light emitting element 12 and transmitted through the lens 32 to be incident on the lens 34 is stopped down by the opening 42. More specifically, the aperture stop 40 has a plate shape having a plate surface parallel to an X-Y plane, and a tip end portion is formed in the aperture stop 40 by being bent to be tapered toward the lens 34 around the optical axis M. This tip end portion is an opening edge 42A that defines the opening 42, and the circular shape defined by the opening 42 adopts the optical axis M as the central axis thereof. In addition, the diameter of the opening 42 according to the present exemplary embodiment is, for example, about 1 mm.

In the Z-axis direction, the distance F1 between the opening edge 42A and the lens 32 is approximately equal to the focal length f1 of the lens 32, and the distance F2 between the opening edge 42A and the lens 34 is approximately equal to the focal length f2 of the lens 34.

Figure 6A:
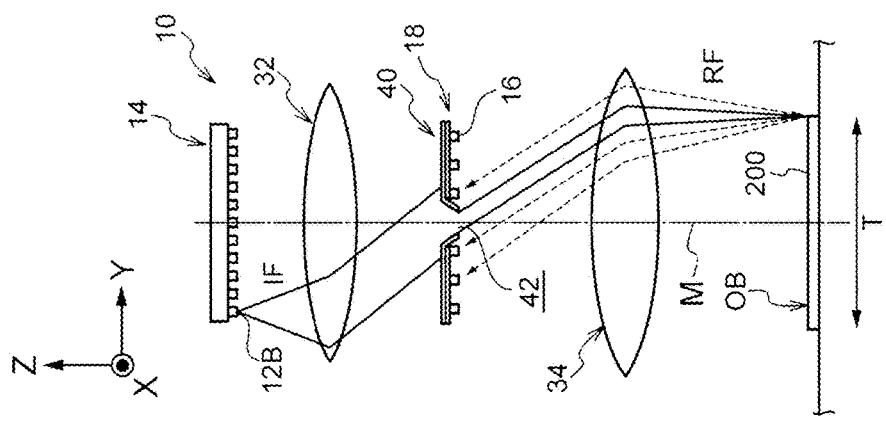
FIGS. 6A to 6C are views for explaining an operation of the measurement apparatus according to the exemplary embodiment.
Figure 6B:
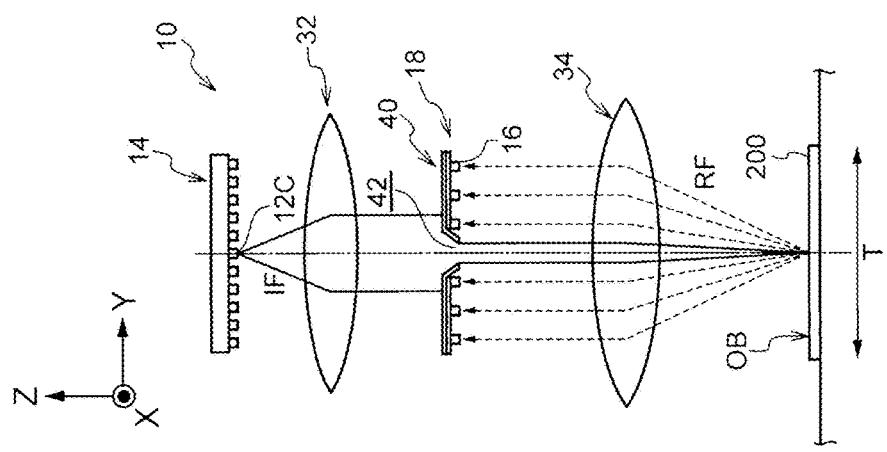
Figure 6C:
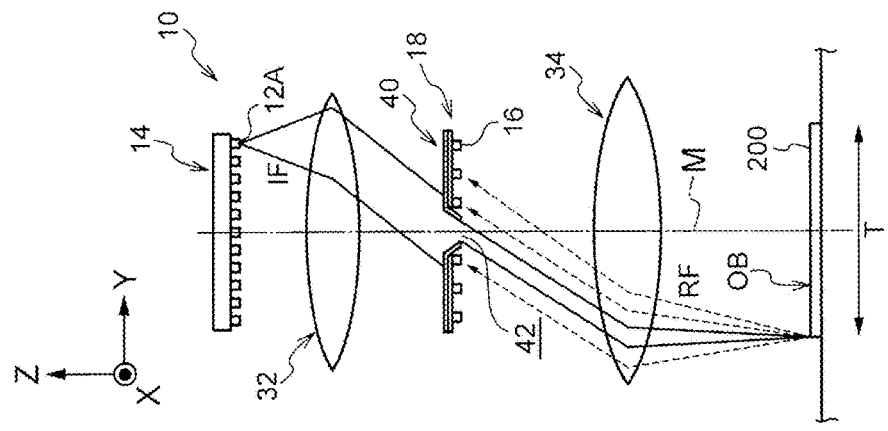

In the optical system 30 according to the present exemplary embodiment configured as described above, the light fluxes, which are sequentially emitted from the respective light emitting elements 12 are thinly stopped down, regardless of the positions of the light emitting elements 12, and are individually projected to the object OB as the irradiation lights IF parallel to the optical axis M (see FIGS. 6A to 6C). In other words, by causing the respective light emitting elements 12 to emit light for scanning, substantially circular light fluxes (spots), which are thinly stopped down and are parallel to one another, are individually projected to the object OB. In addition, in the measurement apparatus 10 according to the present exemplary embodiment, by disposing the object OB in the vicinity of the light condensing point of the light flux of the irradiation lights IF formed by the lens 34, the irradiation regions of the respective irradiation lights IF on the object OB are fine regions having substantially equal diameters. As a result, in the measurement apparatus 10, since the respective irradiation lights are projected with substantially equal irradiation diameters even though the position of the object OB is changed upward and downward in the Z-axis direction, the blurring of an image of the object OB is extremely reduced.

The light receiver 18 includes plural light receiving elements 16, and receives a reflected light RF which is reflected by the object OB and transmitted through the lens 34 of the optical system 30. The light receiver 18 according to the present exemplary embodiment is disposed at a lower side in the Z-axis direction with respect to the aperture stop 40 disposed between the lens 32 and the lens 34. Although not particularly limited, for example, a photodiode (PD), a charge coupled device (CCD), or the like may be used as the light receiving elements 16.

Since the light receiver 18 is disposed between the lens 32 and the lens 34, the light receiving elements 16 are also disposed between the lens 32 and the lens 34 similarly. Here, when the light receiving elements 16 are disposed between the lens 32 and the lens 34, it means that the light receiving elements 16 are disposed inside a cylindrical surface configured by lines P that run through outer diameter ends (virtual contact points between a radius R of a front surface and a radius R of a back surface) of the lens 34 and extend in the Z-axis direction, as illustrated in FIG. 1.

Figure 3A:
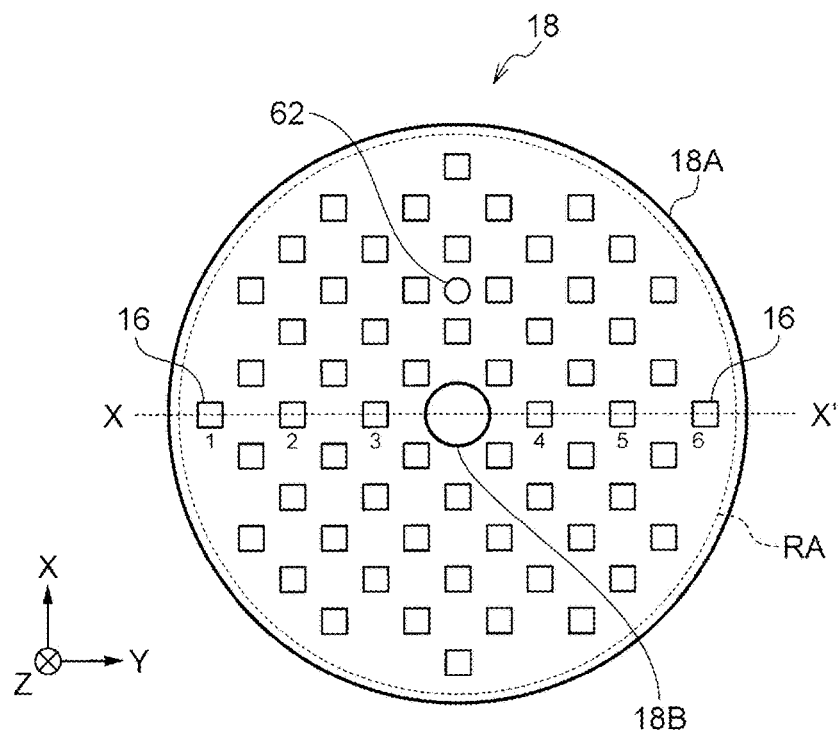
FIG. 3A is a top plan view illustrating an example of a configuration of a light receiver according to the first exemplary embodiment.

FIG. 3A illustrates an example of a configuration of the light receiver 18. FIG. 3A is a top plan view of the light receiver 18 when viewed in the Z-axis direction. The light receiver 18 illustrated in FIG. 1 is illustrated in a cross-sectional view taken along line X-X' in FIG. 3A. As illustrated in FIG. 3A, the light receiver 18 is configured by disposing, for example, the plural light receiving elements 16 (e.g., FIG. 3A illustrates sixty light receiving elements) in a plane shape (array shape) on a substantially circular substrate 18A having a substantially circular opening 18B at the center thereof. The measurement apparatus 10 receives the reflected lights RF using all of the plural light receiving elements 16 as a light receiving region RA. An opening 62 is provide in the substrate 18A of the light receiver 18 so as to cause the reflected light RF to be transmitted through the opening 62. Details of the opening 62 will be described below.

FIG. 3A exemplifies the light receiver 18, which has the plural light receiving elements 16 disposed on the whole surface of the substrate 18A. It should be noted that the invention is not limited thereto. The light receiver 18 may be configured such that the light receiving elements 16 are disposed on a part of the substrate 18A according to a light receiving range or the like of the reflected lights RF.

Figure 3B:
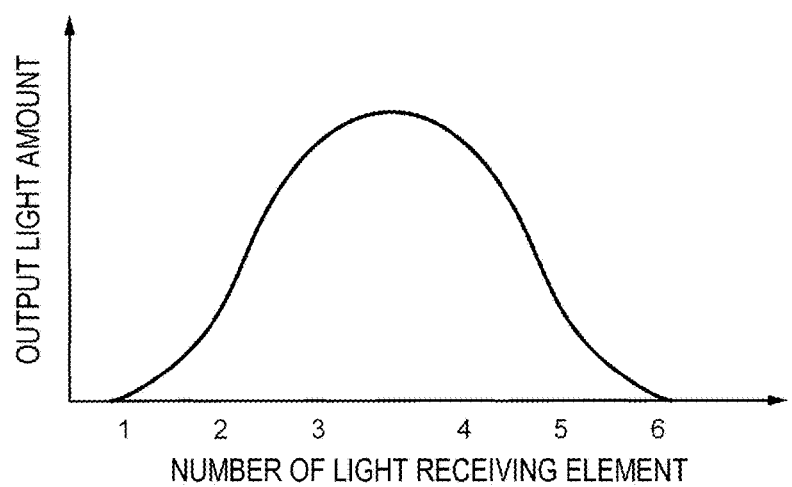
FIG. 3B is a light amount distribution of reflected light in the light receiver.

The range of the reflected light RF received in the light receiving region RA is, for example, a reflected light RF in a range of an angle of 0° to 40° centered on an axis parallel to the optical axis M. When this reflected light RF is received in the light receiving region RA, a three-dimensional distribution is formed by the received light amounts of the respective light receiving elements 16. In a case where the reflected light RF is isotropic like the light reflected by a perfect diffuse surface, the shape of a cross section of a three-dimensional distribution, which is taken along a plane including the Z axis, becomes substantially a Gaussian curve, as illustrated in FIG. 3B. In addition, numbers 1 to 6 of the light receiving elements on a horizontal axis in FIG. 3B correspond to numbers 1 to 6 of the light receiving elements 16 illustrated in FIG. 3A. In addition, an actual output distribution is discrete because no reflected light RF is received between two adjacent light receiving elements 16 in the light receiving region RA, which is omitted from FIG. 3B.

In the measurement apparatus 10, because the light receiving surface of the light receiving element 16 and the opening edge 42A are positioned at the same position in the Z-axis direction, the distance F2 between the light receiving surface of the light receiving element 16 and the lens 34 is equal to the focal length f2 of the lens 34. For this reason, even though the position of the object OB is changed upward and downward in the Z-axis direction, or leftward and rightward in the Y-axis direction such that the irradiation lights IF are projected from the different light emitting elements 12, the output distribution in the light receiving region RA is always constant as long as the projection positions of the irradiation light IF to the object OB are the same.

In other words, assuming that a fine region having a size substantially the same as the irradiation diameter as the object OB, when the object OB moves upward and downward in the Z-axis direction, or moves leftward and rightward in the Y-axis direction, the object OB is irradiated with different irradiation lights IF from the different light emitting elements 12, and thus reflects different reflected lights RF. However, in the measurement apparatus 10 according to the present exemplary embodiment, the output distributions made by all the light receiving elements 16 included in the light receiving region RA are always the same as each other regardless of the positions at which the reflected lights RF are generated.

Figure 4:
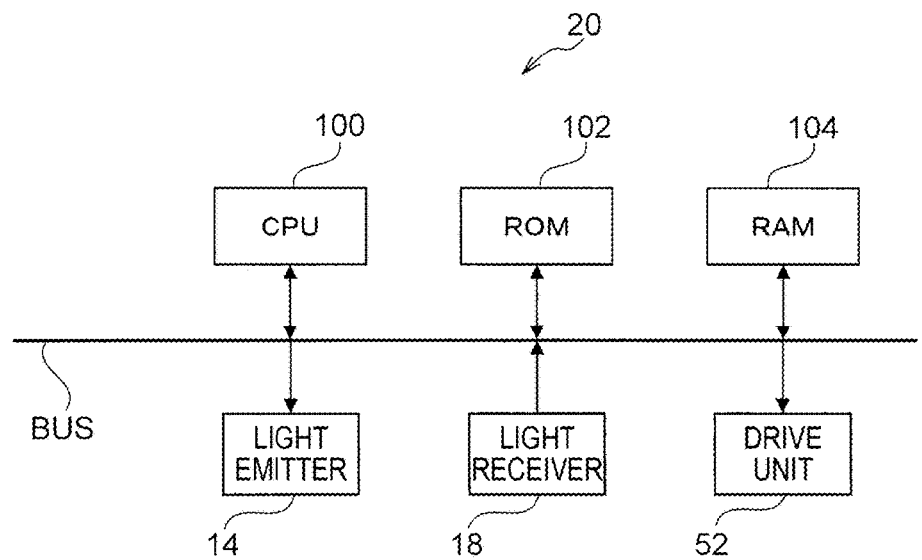
FIG. 4 is a block diagram illustrating an example of a configuration of a controller according to the exemplary embodiment.

As illustrated in FIG. 4, the controller 20 includes a central processing unit (CPU) 100, a read only memory (ROM) 102, and a random access memory (RAM) 104. The CPU 100 collectively controls the entire measurement apparatus 10, the ROM 102 is a memory unit that stores in advance a control program for the measurement apparatus 10, and the RAM 104 is a memory unit to be used as a work area or the like when a program such as the control program is executed. The CPU 100, the ROM 102, and the RAM 104 are connected to each other through a bus BUS.

A drive unit 52, which operates a moving device (not illustrated) configured to move the light emitter 14, the light receiver 18, and the object OB, is connected to the bus BUS, and the light emitter 14, the light receiver 18, and the drive unit 52 are controlled by the CPU 100 through the bus BUS.

Figure 5A:
FIGS. 5A to 5C are time charts for explaining an operation of controlling a light emitter and the light receiver according to the exemplary embodiment.
Figure 5B:
Figure 5C:
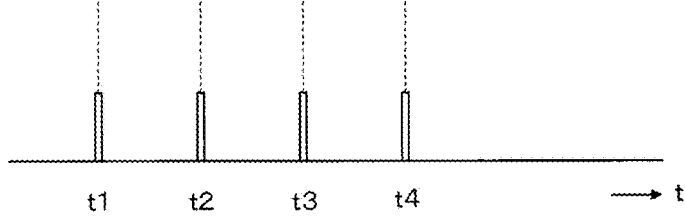

An operation of controlling the light emitter 14 and the light receiver 18 by the controller 20 will be described with reference to FIG. 5. FIG. 5A illustrates a light emitting pulse signal P1 for causing a predetermined light emitting element 12 to emit light and FIG. 5B illustrates a light emitting pulse signal P2 for causing a subsequent light emitting element 12 to emit light, in the case where the light emitting elements 12 of the light emitter 14 are caused to sequentially emit light as described above. As illustrated in FIGS. 5A and 5B, in the control of the light emitter 14 according to the present exemplary embodiment, no signal (0 level) time for a predetermined period is provided between the light emitting pulse signal P1 and the light emitting pulse signal P2 (parts corresponding to time t2 and time t4 in FIG. 5). FIG. 5C illustrates read pulses when the light receiver receives the reflected lights RF generated by the irradiation lights IF generated from the light emitting elements 12 according to the light emitting pulse signals P1 and P2. Based on the read pulses, the received light amounts of all the light receiving elements 16 included in the light receiver 18 (i.e., the light receiving elements 16 in the light receiving region RA), which becomes a signal indicating the output distribution.

First, the reflected light RF of the irradiation light IF generated according to the light emitting pulse signal P1 is read by all the light receiving elements 16 at time t1. Now, assuming that the total number of the light receiving elements 16 is k, k light receiving signals $Sr(1)$, $Sr(2)$, ..., $Sr(k)$ are acquired from the respective light receiving elements 16. Next, at time t2, the received light amount at the zero (0) level between the light emitting pulse signal P1 and the light emitting pulse signal P2 is read by all the light receiving elements 16. The k light receiving signals at the zero (0) level, which are read by all the light receiving elements 16, will be referred to as Sr0(1), Sr0(2), . . . , Sr0(k). Next, differences between the light receiving signals of the reflected light RF of all the light receiving elements 16 and the light receiving signals at the zero (0) level, that is, Sr(1)-Sr0(1), Sr(2)-Sr0(2), . . . , Sr(k)-Sr0(k) are calculated, and the k differential values are set as the output distribution of the received light amount. The output distribution is also calculated in the similar manner even after the light emitting pulse signal P2. The calculated output distribution may be temporarily stored in the memory unit such as the RAM 104.

The reason why the signals indicating the output distribution according to a reflected light RF is generated by subtracting the light receiving signals at the no signal time from the light receiving signals of the reflected light RF as described above is to eliminate an influence caused by an disturbance light. When the influence by the disturbance light is negligible, the light receiving signals of the reflected light RF may be used as they are as the signals indicating the output distribution. In this case, it is not necessary to make a space between successive light emitting pulse signals, and furthermore, since a light receiving timing is determined by the read pulses, the light emitting pulse signals may partially overlap each other.

Next, an operation of the measurement apparatus 10 when measuring a reflection property (e.g., an unevenness degree of a surface) of the object OB will be described with reference to FIGS. 6A to 6C. FIGS. 6A to 6C illustrate the light flexes of the irradiation light IF in the case where the light emitting elements 12A, 12C, and 12B of the light emitter 14 sequentially emit light and the light fluxes of the reflected light RF in the case where the irradiation light IF is reflected by the surface 200 of the object OB and guided to the light receiver 18.

First, when the object OB moves in the −X direction such that the lead end of the object OB enters the measurement region T, the respective light emitting elements 12 sequentially emit light with a time difference, and the irradiation lights IF are individually projected toward the object OB. In addition, until the rear end of the object OB exits the measurement region T, a cycle of light emission from the light emitting element 12A to the light emitting element 12B is repeated. As described above, the light emission of the light emitting elements 12 is controlled by the controller 20.

A divergence degree of the light flux of the irradiation light IF emitted from each light emitting element 12 is changed by the lens 32 such that the light flux is directed toward the lens 34. The light flux, which has been subjected to the change of the divergence degree by the lens 32, is stopped down (restricted) by the aperture stop 40. The light flux stopped down by the aperture stop 40 is condensed by the lens 34, and projected to the object OB in the Z-axis direction (the direction parallel to the optical axis M). In other words, the object OB is disposed in the vicinity of the light condensing point of the irradiation light IF which is formed by the lens 34. The irradiation light according to the present exemplary embodiment is condensed to, for example, a diameter (φ) of about several tens of micrometers (μm) on the surface 200 of the object OB as described above.

The irradiation light IF projected to the object OB is reflected by the surface 200 of the object OB, thereby generating the reflected light RF (indicated by dotted lines with arrows in FIG. 6). The directions of the light fluxes of the reflected light RF are changed by the lens 34 such that the light fluxes are directed toward the respective light receiving elements 16. The reflected light RF transmitted through the lens 34 is received by the respective light receiving elements 16.

The irradiation light IF is reflected in various directions according to the condition of the surface 200 of the object OB. However, as described above, in the present exemplary embodiment, the reflected light RF is received in the range of an angle of 0° to 40° which is centered on an axis that runs through an incident point of the irradiation light IF to the surface 200 parallel to the optical axis M. Therefore, the light receiving region RA of the light receiver 18, which corresponds to the irradiation light IF emitted from on light emitting element 12, has a substantially circular shape. FIG. 3A illustrates an example of the light receiving region RA.

The light receiving signals received by the respective light receiving elements 16 are read at a predetermined timing under the control of the controller 20 as described above. The read light receiving signals may be temporarily stored in the memory such as the RAM 104. The controller 20 produces an output distribution (light receiving profile) in the light receiving region RA by using the light receiving signals (brightness signals) corresponding to the respective light emitting elements 12. Because the output distribution includes angle information of the reflected light RF, for example, the unevenness degree of the object OB is measured.

As described above, according to the measurement apparatus 10 according to the present exemplary embodiment, when the reflected lights RF of the lights individually projected from the light emitting elements 12 toward the object OB are received by the light receiving elements 16, and as a result, a change in shape, a surface condition, or the like of the object OB is precisely measured.

In the aforementioned configuration, that is, in the measurement apparatus in which the irradiation light is projected to the object from the light emitting unit through a telecentric optical system having the light emitting unit side lens, the object side lens, and the aperture stop provided between the two lenses, and the light receiving unit receives the reflected light from the object, there is an increasing need for a function of measuring not only a condition of a surface of the object, but also a height of the surface of the object. In the measurement of the height of the surface of an object, a dedicated height measuring instrument has already existed, and it is considered that the height of the surface of the object is measured using the height measuring instrument. However, in this method, because it is required to provide the height measuring instrument in addition to the measurement apparatus, and to remove (detach) the height measuring instrument after the measurement of the height, which causes the measurement work to be complicated.

Therefore, in the present exemplary embodiment, the measurement apparatus, which measures a height of the surface of the object, is implemented by making a simple change and using the features of the optical system in the measurement apparatus 10. That is, in the measurement apparatus in the related art, an opening is provided in a part of the substrate of the light receiver which is disposed in a focal plane and has the aperture stop at a center thereof. A part of the reflected light, which is reflected by the surface of the object, passes through the object side lens, and then passes through the opening. However, reflected lights, which are reflected at the same angle, pass through the opening regardless of a difference in height between reflection points.

However, the reflected lights passing through the opening run along different optical paths in consideration of a difference in height h, and the reflected lights are moved by a distance D according to the height h from a reference position in consideration of projection with respect to a virtual plane at a side closer to the light emitting unit than the opening. When differences in height h and distances D according to the differences are tabled in advance, and a distance D is measured by placing another light receiver on the virtual plane, a height h may be obtained. According to the measurement apparatus according to the present exemplary embodiment, which is implemented based on the point of view described above, there is provided a measurement apparatus capable of measuring a height of the surface of an object with a simple configuration, compared with the case where the height measuring instrument is separately provided.

Figure 7:
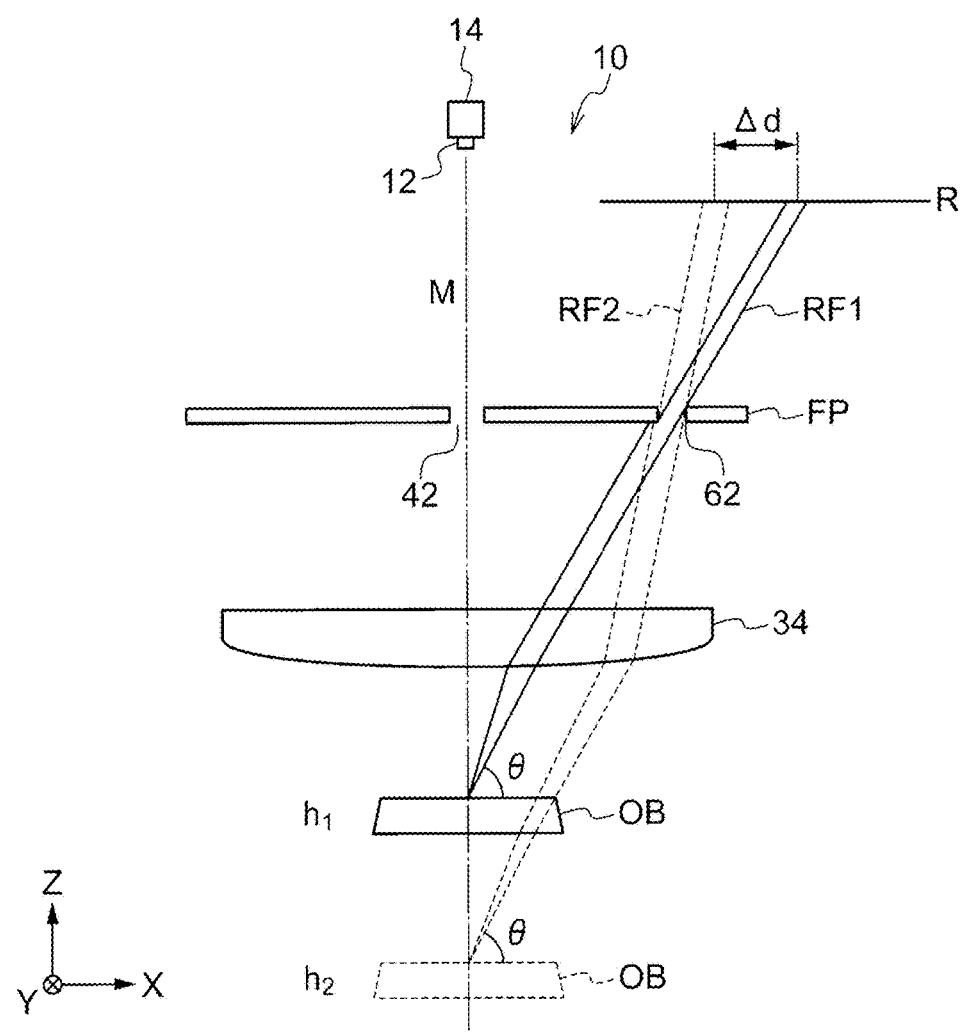
FIG. 7 illustrates a part of a view for explaining an operational principle of the measurement apparatus according to the exemplary embodiment.

Next, a measurement principle of the measurement apparatus 10 according to the present exemplary embodiment will be described in more detail with reference to FIGS. 7 to 9B. As described above, in the measurement apparatus 10 according to the present exemplary embodiment, the light receiver 18 is disposed on a plane (focal plane) where focal points of the lenses 32 and 34 are positioned, and the opening 42 is provided in the focal plane. FIG. 7 is a view briefly illustrating the measurement apparatus 10 in FIGS. 1 and 2. In FIG. 7, the light receiver 18 is omitted, and a position at which the light receiver 18 is disposed is indicated as a focal plane FP having an opening 42 and an opening 62. Further, in FIGS. 7 to 9B, the lens 32 is omitted.

FIG. 7 illustrates a difference in reflected light RF according to a difference in height h of the surface of the object OB, and a principle of measuring the height based on the difference. As described above, when the irradiation light IF (not illustrated, see FIG. 6) is projected to the surface of the object OB from the light emitting element 12 of the light emitter 14, the reflected lights RF are generated along different paths according to the difference in height h. That is, as illustrated in FIG. 7, a reflected light RF1 is generated as the light is reflected by a portion on the surface of the object OB at a height h1, and a reflected light RF2 is generated as the light is reflected by a portion at a height h2. In addition, in FIG. 7, the object OB at the height h1 and the object OB at the height h2 are illustrated, respectively, for the convenience of easy understanding, but both heights indicate a difference between heights of the same object OB. In the present exemplary embodiment, the height h is measured in a +Z direction based on a predetermined position on a Z-axis (height h=0). That is, the height h1 is greater than the height h2.

In the measurement apparatus 10 according to the present exemplary embodiment, even though the height of the surface of the object OB varies, the reflected lights RF having the same reflection angle are condensed on the same portion on the focal plane FP after the reflected lights RF pass through the different positions in the lens 34. Therefore, considering the reflected lights RF which are reflected by the object OB and then pass through the opening 62, both of the reflected light RF1 reflected by the portion at the height h1 of the object OB at a reflection angle θ and the reflected light RF2 reflected by the portion at the height h2 at the same reflection angle θ, arrive at the opening 62.

However, the arrival positions of the reflected lights RF1 and RF2 on a virtual plane R, which is positioned at a side closer to the light emitter 14 than the opening 62 and perpendicular to the optical axis M, are different from each other in consideration of a difference in reflection path between the reflected lights RF1 and RF2. In other words, the reflected lights RF, which are reflected by the object OB at different heights, are detected at different positions after the reflected lights RF pass through the opening 62. That is, a distance Δd between the position of the reflected light RF1 on the virtual plane R and the position of the reflected light RF2 on the virtual plane R reflects the height difference between the height h1 and the height h2 of the object OB, Δh=h1−h2. That is, a ratio between the distance Δd and the height difference Δh is 1:1.

Figure 8A:
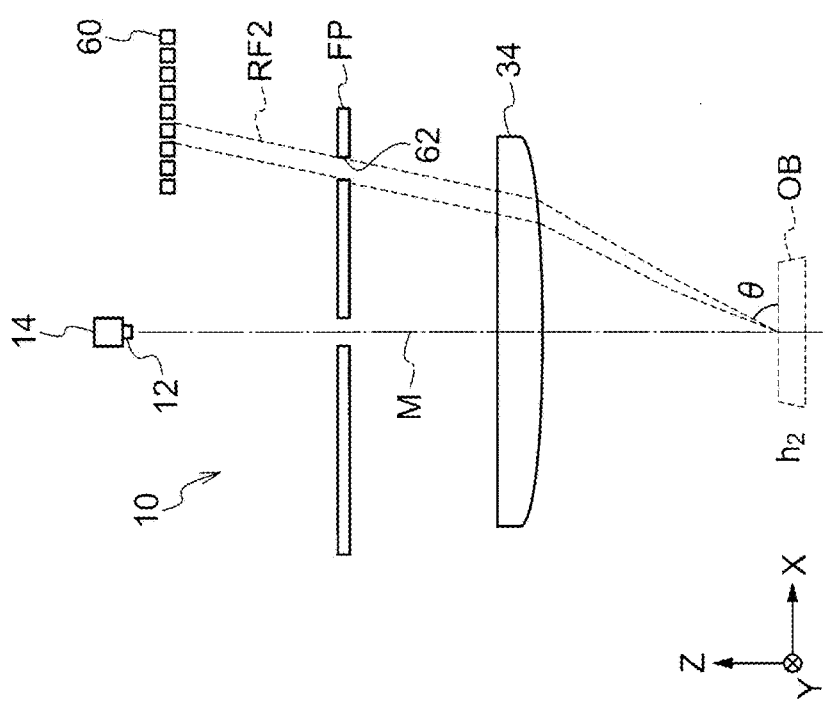
FIGS. 8A and 8B illustrate a part of a view for explaining the operational principle of the measurement apparatus according to the exemplary embodiment.
Figure 8B:
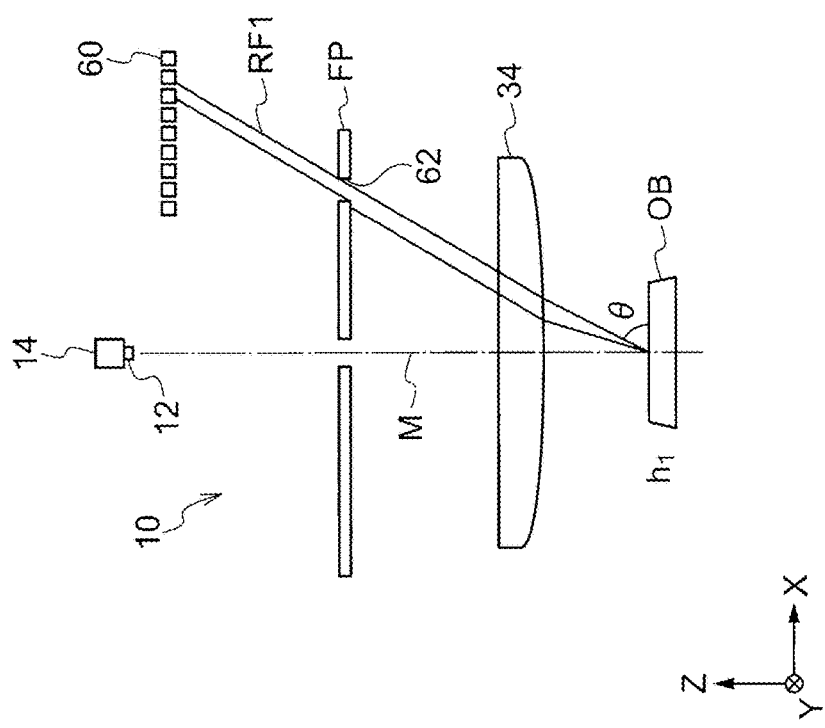

As illustrated in FIGS. 8A and 8B, in the measurement apparatus 10, the opening 62 is provided at a spot (see FIG. 3A as well) that is apart of the focal plane and is not provided with the light receiving elements 16, the reflected light RF is transmitted through the opening 62, and a second light receiver 60 is disposed at a position of the virtual plane R, thereby receiving the reflected light RF. As the second light receiver 60, a position sensitive detector (PSD) (an optical position sensor) and the like may be used, in addition to the light receiving element such as a PD.

Considering the characteristics of the measurement apparatus 10, the distance Δd is measured by detecting a relative position of the reflected lights RF on the second light receiver 60 in consideration of height information, and the height h is measured by using the result. A relationship between the height h of the surface of the object OB and a position on a light receiving surface of the second light receiver 60 may be measured in advance based on, for example, a predetermined height h, tabled, and stored in a memory unit, such as the ROM 102. In addition, even though the light emitting elements 12 of the light emitter 14 are caused to sequentially emit light, the optical paths of the reflected light RF, when viewed in a direction in FIGS. 8A and 8B, become the same optical path regardless which light emitting elements 12 are caused to emit light.

Meanwhile, FIGS. 9A and 9B illustrate the measurement apparatus 10 when viewed from the right side in a front view of the drawings sheet of FIGS. 8A and 8B. FIGS. 9A and 9B illustrate respective reflected lights RF when the light emitting elements 12 (not illustrated) arranged in the Y-axis direction are caused to sequentially emit light. In addition, since FIGS. 9A and 9B illustrate a case in which the number of the light emitting elements 12 is four, the number of reflected lights RF is four of RF1 to RF4 (or RF1' to RF4').

FIG. 9A illustrates the reflected lights RF1, RF2, RF3, and RF4 reflected by the portion of the object OB at the height h1, and FIG. 9B illustrates the reflected lights RF1', RF2', RF3', and RF4' reflected by the portion of the object OB at the height h2. Irradiation points on the object OB projected by the light emitting elements 12 caused to sequentially emit light (i.e., reflection points) are arranged in the Y-axis direction. However, as illustrated in FIGS. 9A and 9B, the positions of the reflection points are identical to each other regardless of the difference between the heights h1 and h2. Therefore, the optical paths after passing through the opening 62 become the same regardless of the difference between the heights h1 and h2.

Next, a relationship between the sequential light emission of the light emitting elements 12 and the light receiving spots of the reflected lights RF on the light receiving surface of the second light receiver 60 will be described in more detail with reference to FIGS. 10A to 17C. FIG. 10A is a view more briefly illustrating the measurement apparatus 10 when viewed from a direction identical to the direction in FIGS. 8A and 8B, and FIG. 10C is a view more briefly illustrating the measurement apparatus 10 when viewed from the direction identical to the direction in FIGS. 9A and 9B. FIG. 10B is a top plan view of the measurement apparatus when viewed from the top side (+Z direction), and schematically illustrates a relative positional relationship among the lens 34, the opening 62, and the second light receiver 60. A cross section taken along line A-A' in FIG. 10B corresponds to FIG. 10A, and a cross section taken along line B-B' in FIG. 10B corresponds to FIG. 10C.

FIGS. 11A to 16C illustrate the reflected lights RF and the light receiving spots S on the second light receiver 60 in a case where the six light emitting elements 12 are caused to sequentially emit light, when viewed in the respective directions illustrated in FIGS. 10A to 10C. FIGS. 11B to 16B illustrate a light receiving surface V of the second light receiver 60, and ⊙ on the light receiving surface V indicates a light receiving spot S, and ○ indicate a virtual spot. In FIGS. 11A to 16C, three types of heights h1, h2, and h3 are assumed as the heights of the object OB, and the virtual spot indicates a position on the light receiving surface V of the second light receiver 60 where the light receiving spot S is likely to be disposed according a difference in height.

Figure 11C:
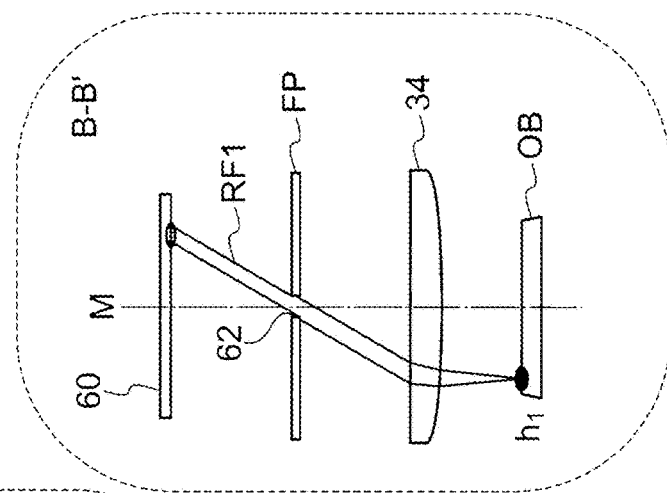
FIGS. 11A to 11C illustrate a part of a view for explaining the operation of the measurement apparatus according to the first exemplary embodiment.
Figure 11B:
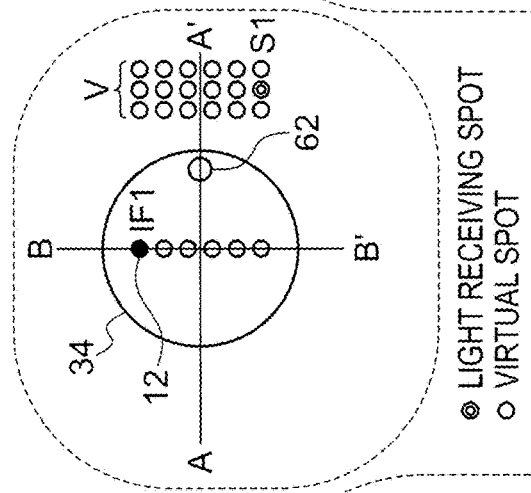
Figure 11A:
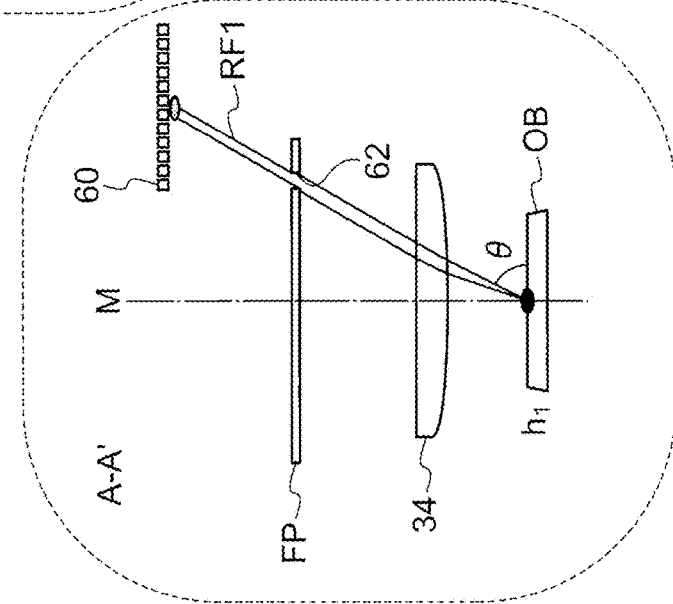

As described above, the plural light emitting elements 12 according to the present exemplary embodiment are caused to sequentially emit light in the −Y direction. FIG. 11B illustrates a state in which among the light emitting elements 12, emits light, a first light emitting element 12 emits light to project an irradiation light IF1. In this case, as illustrated in FIGS. 11A and 11C, a height of the surface of the object OB is h1, and a reflection angle is θ. A reflected light RF1 reflected by the surface of the object OB passes through the opening 62, and forms a light receiving spot S1 on the light receiving surface V of the second light receiver 60, as illustrated in FIG. 11B.

Figure 12C:
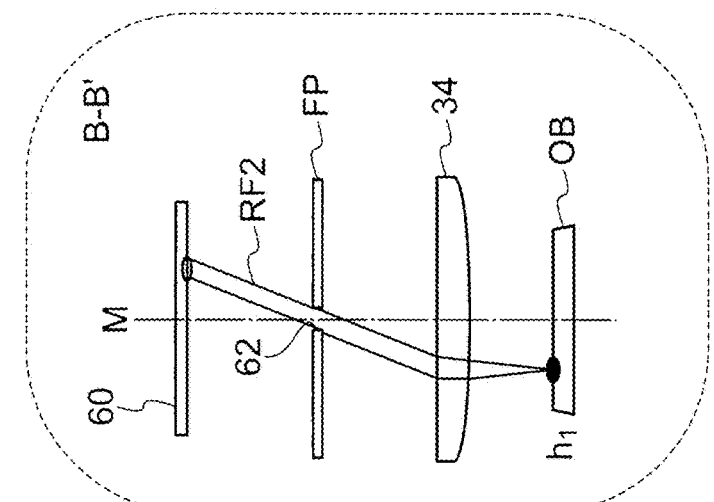
FIGS. 12A to 12C illustrate a part of a view for explaining the operation of the measurement apparatus according to the first exemplary embodiment.
Figure 12B:
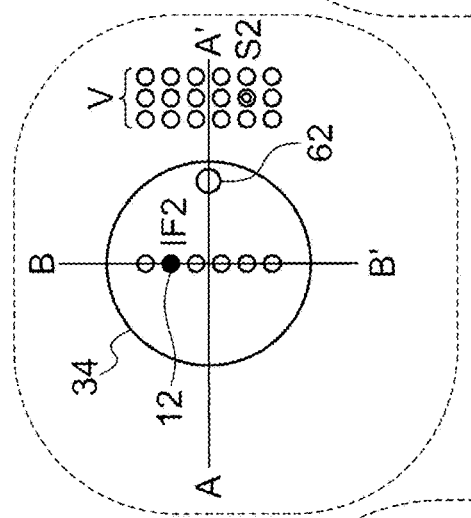
Figure 12A:
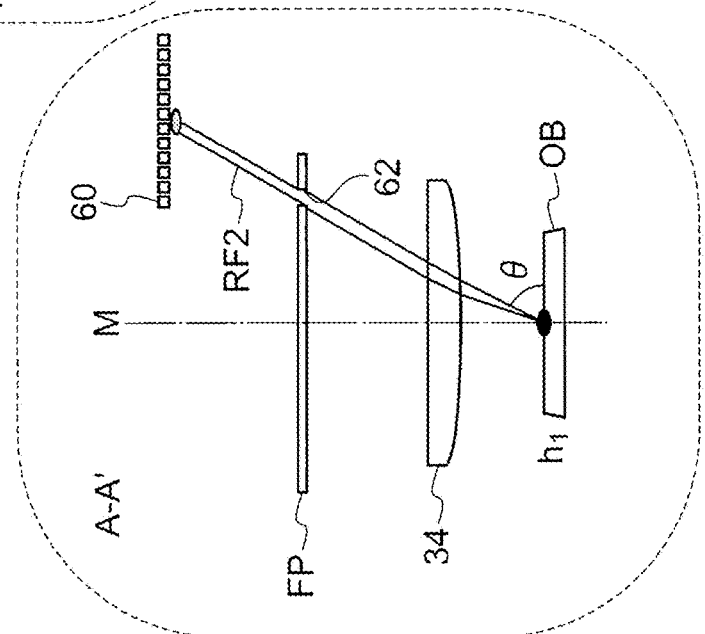

FIGS. 12A to 12C illustrate a state in which a second light emitting element 12 emits light in a case in which a height of the object OB is identical to the height h1 in FIGS. 11A to 11C. That is, as illustrated in FIG. 12B, when the second light emitting element 12 emits light, the irradiation light IF2 is projected from the second light emitting element 12. When the irradiation light IF2 is reflected by the surface of the object OB, the reflected light RF2 passes through the opening 62 as illustrated in FIGS. 12A and 12C, and forms the light receiving spot S2 on the light receiving surface V of the second light receiver 60 as illustrated in FIG. 12B.

Figure 13C:
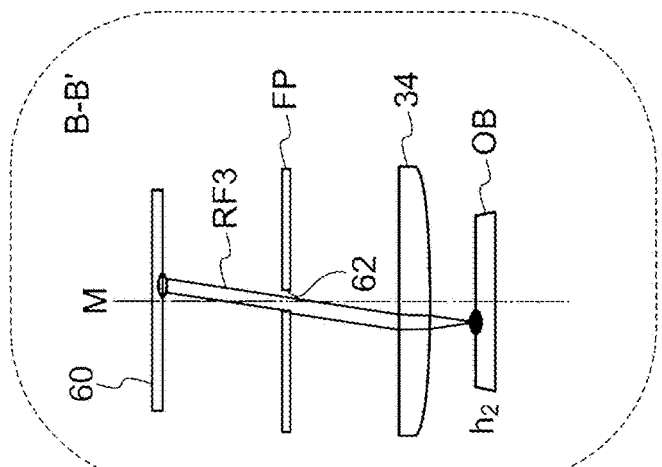
FIGS. 13A to 13C illustrate a part of a view for explaining the operation of the measurement apparatus according to the first exemplary embodiment.
Figure 13B:
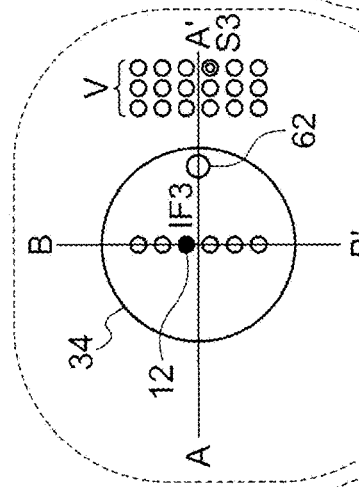
Figure 13A:
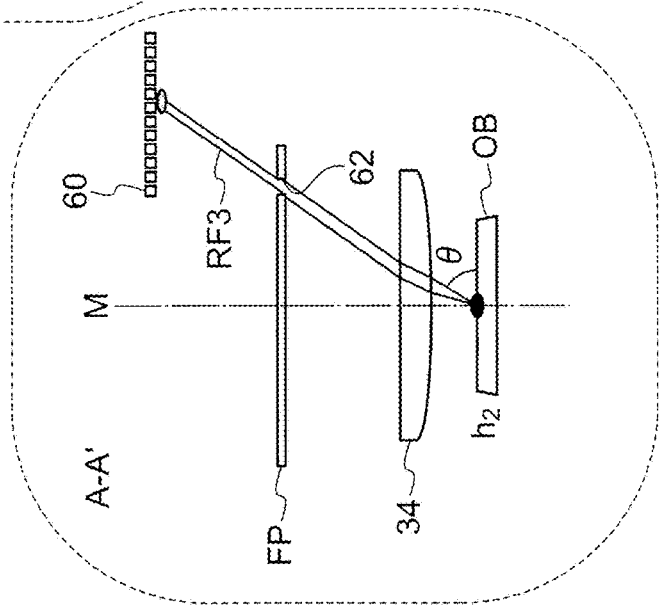

FIGS. 13A to 13C illustrate a state in which a third light emitting element 12 emits light in a case where the height of the object OB is changed to the height h2 (>h1). That is, as illustrated in FIG. 13B, when the third light emitting element 12 emits light, the irradiation light IF3 is projected from the third light emitting element 12. When the irradiation light IF3 is reflected by the surface of the object OB, the reflected light RF3 passes through the opening 62 as illustrated in FIGS. 13A and 13C, and forms the light receiving spot S3 on the light receiving surface V of the second light receiver 60 as illustrated in FIG. 13B. In FIGS. 13A to 13C, because the height of the object OB is changed, a position at which the light receiving spot S3 is formed is different from positions at which the light receiving spots S1 and S2 are formed. That is, in FIGS. 13A to 13C, because the height h2 is higher than the height h1, the position in the X-axis direction at which the light receiving spot S3 is formed deviates from the light receiving spots S1 and S2 in the +X direction.

FIGS. 14A to 14C illustrate a state in which a fourth light emitting element 12 emits light in a case where a height of the object OB becomes the height h1 in FIGS. 11A to 11C again. That is, as illustrated in FIG. 14B, when the fourth light emitting element 12 emits light, the irradiation light IF4 is projected from the fourth light emitting element 12. When the irradiation light IF4 is reflected by the surface of the object OB, the reflected light RF4 passes through the opening 62 as illustrated in FIGS. 14A and 14C, and forms the light receiving spot S4 on the light receiving surface V of the second light receiver 60 as illustrated in FIG. 14B. The position of the light receiving spot S4 in the X-axis direction is identical to the positions in the X-axis direction at which the light receiving spots S1 and S2 are formed.

Figure 15C:
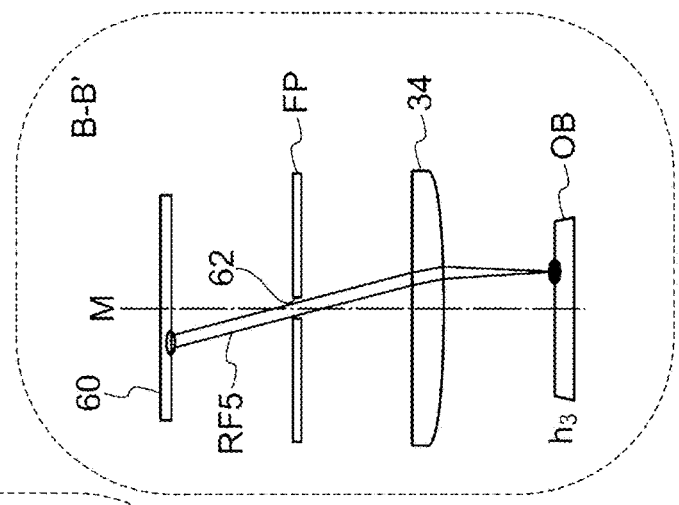
FIGS. 15A to 15C illustrate a part of a view for explaining the operation of the measurement apparatus according to the first exemplary embodiment.
Figure 15B:
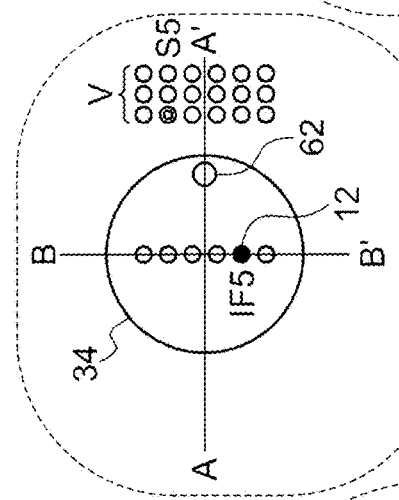
Figure 15A:
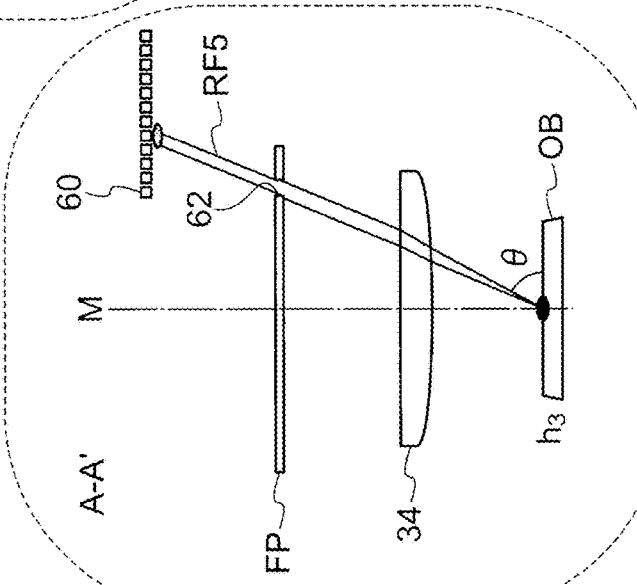

FIGS. 15A to 15C illustrate a state in which a fifth light emitting element 12 emits light in a case where a height of the object OB is changed to the height h3 (<h1). That is, as illustrated in FIG. 15B, when the fifth light emitting element 12 emits light, the irradiation light IF5 is projected from the fifth light emitting element 12. When the irradiation light IF5 is reflected by the surface of the object OB, the reflected light RF5 passes through the opening 62 as illustrated in FIGS. 15A and 15C, and forms the light receiving spot S5 on the light receiving surface V of the second light receiver 60 as illustrated in FIG. 15B. In FIGS. 15A to 15C, because the height h3 of the object OB is different from the heights in FIGS. 11A to 12C, the position in the X-axis direction at which the light receiving spot S5 is formed is different from the positions at which the light receiving spots S1 and S2 are formed. That is, in FIGS. 15A to 15C, because the height h3 is lower than the height h1, the position in the X-axis direction at which the light receiving spot S5 is formed deviates from the light receiving spots S1 and S2 in the −X direction.

FIGS. 16A to 16C illustrate a state in which a sixth light emitting element 12 emits light in a case in which a height of the object OB is the height h1 in FIG. 11 again. That is, as illustrated in FIG. 16B, when the sixth light emitting element 12 emits light, the irradiation light IF6 is emitted from the sixth light emitting element 12. When the irradiation light IF6 is reflected by the surface of the object OB, the reflected light RF6 passes through the opening 62 as illustrated in FIGS. 16A and 16C, and forms the light receiving spot S6 on the light receiving surface V of the second light receiver 60 as illustrated in FIG. 16B. The position of the light receiving spot S6 in the X-axis direction is identical to the positions in the X-axis direction at which the light receiving spots S1 and S2 are formed.

Figure 17A:
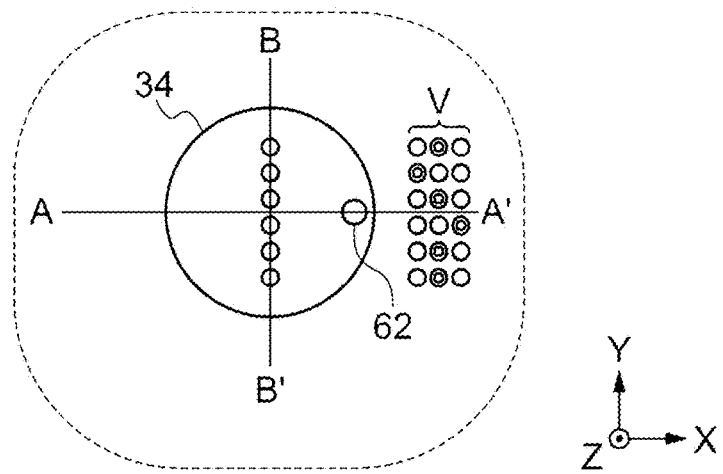
FIGS. 17A to 17C are views for explaining a second light receiver and light receiving spots of the measurement apparatus according to the first exemplary embodiment.
Figure 17B:
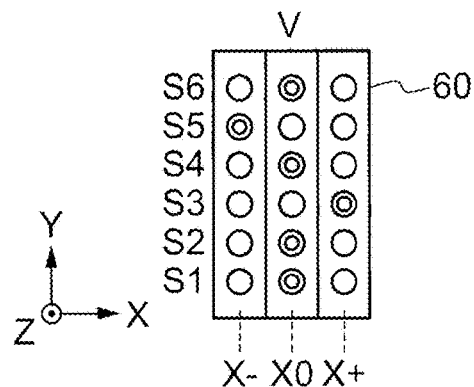
Figure 17C:
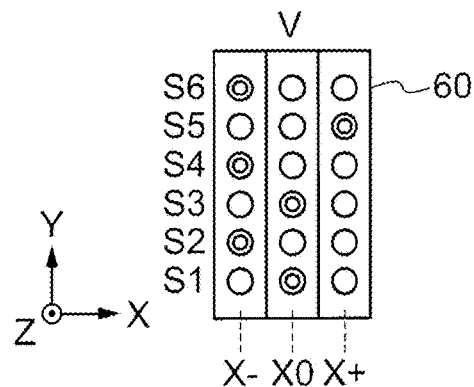

FIG. 17A is a view illustrating all the light receiving spots S1 to S6 on the light receiving surface V of the second light receiver 60 acquired as a result of the operation of the measurement apparatus 10 illustrated in FIGS. 11A to 16C, and FIG. 17B is a view illustrating the light receiving spots S1 to S6 extracted from FIG. 17A together with the second light receiver 60. In FIG. 17B, an X coordinate X0 corresponds to the height h1, X+ corresponds to the height h2 (>h1), and X-corresponds to the height h3 (<h1). That is, while the light receiving spot S is moved in the +Y direction by the sequential light emission of the light emitting elements 12, the position on the X-axis is changed according to the height h. Because the order of the sequential light emission of the light emitting elements 12 is already known, the light receiving elements may be disposed in three rows on the second light receiver 60 in order to find the heights h1, h2, and h3. Based on the aforementioned principle, the measurement apparatus 10 according to the present exemplary embodiment is configured to measure a height.

FIG. 17B illustrates a result of fixing the object OB to a point on the X-axis, and causing the light emitting elements 12 to sequentially emit light once. When the object OB is moved to a next step position on the X-axis and the light emitting elements 12 are caused to sequentially emit light similarly, for example, the light receiving spots S1 to S6 illustrated in FIG. 17C, which are different from those in FIG. 17B, are acquired according to a condition of the height h of the surface of the object OB at the corresponding step position (of course, the light receiving spots S1 to S6 identical to those in FIG. 17B may be acquired in some cases). Therefore, as the light receiving elements disposed on the second light receiver 60, for example, three light receiving elements, which are elongated in the Y-axis direction, may be used.

In addition, in the aforementioned embodiment, descriptions have been made while exemplifying a case in which discrete light receiving spots S are acquired in a case in which a height of the surface of the object OB is one of the three heights h1, h2, and h3 for the convenience of ease understanding, but in practice, the light receiving spots S may be acquired continuously in some cases according to various continuous heights. In this case, for example, a two-dimensional PSD may be used as the light receiving element.

Based on the aforementioned principle, the measurement apparatus 10 according to the present exemplary embodiment is configured to measure a height. Therefore, according to the measurement apparatus 10 according to the present exemplary embodiment, a measurement apparatus, which measures a height of the surface of the object by using a simple configuration, is provided, compared with a case in which another height measuring instrument is provided in the measurement apparatus which receives reflected light from the object by projecting the irradiation light to the object through the telecentric optical system having the two lenses and the aperture stop disposed between the lenses.

Second Exemplary Embodiment

A measurement apparatus 10a according to the present exemplary embodiment will be described with reference to FIGS. 18A to 19D. The present exemplary embodiment uses a condensing lens 66 which condenses the light receiving spot S, and a second light receiver 64 which corresponds to the condensing lens 66 in the measurement apparatus 10 according to the aforementioned exemplary embodiment. Therefore, the measurement apparatus 10a differs from the measurement apparatus 10 only in that the condensing lens 66 is provided, and the second light receiver 60 is substituted with the second light receiver 64, and as a result, the same components are designated by the same reference numerals, and detailed descriptions thereof will be omitted.

Figure 18A:
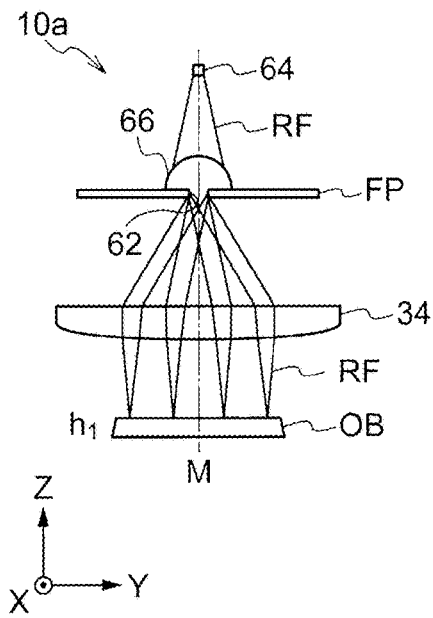
FIGS. 18A to 18D are views illustrating an example of a configuration of a measurement apparatus according to a second exemplary embodiment.
Figure 18B:
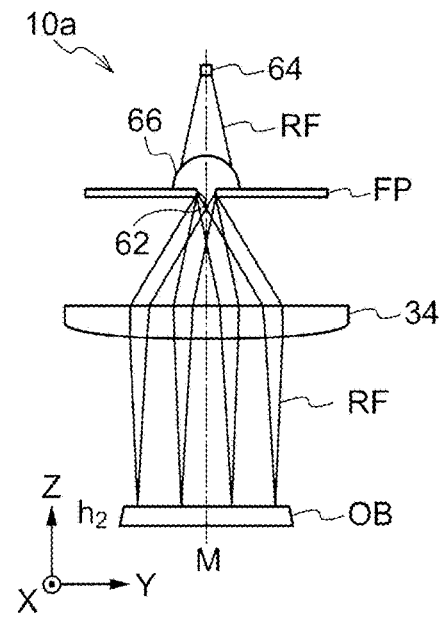
Figure 18C:
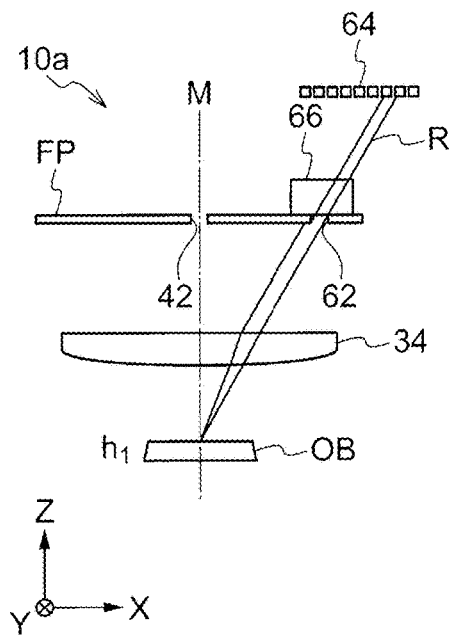
Figure 18D:
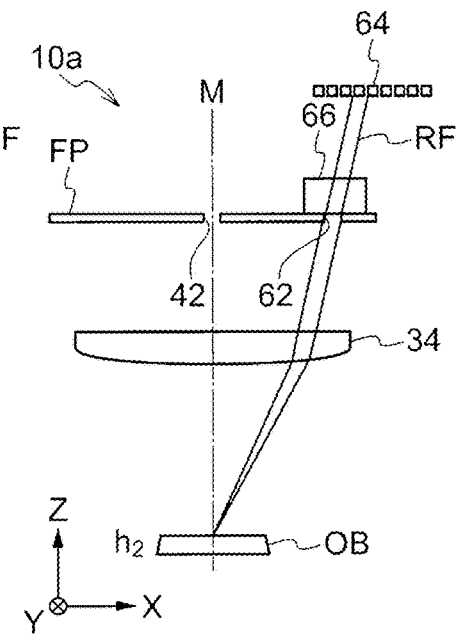

FIG. 18A is a side view of the measurement apparatus 10a when viewed in a direction identical to the direction in FIGS. 9A and 9B in a case where a height of the surface of the object OB is h1, and FIG. 18B is a side view of the measurement apparatus 10a when viewed in a direction identical to the direction in FIGS. 9A and 9B in a case where the height is h2 (<h1). However, FIGS. 18A and 18B illustrate a case in which the number of the light emitting elements 12 is four, and as a result, the number of the reflected lights RF is also four. In addition, FIG. 18C is a side view of the measurement apparatus 10a when viewed in a direction identical to the direction in FIG. 7 in a case where the height of the surface of the object OB is h1, and FIG. 18D is a side view of the measurement apparatus 10a when viewed in a direction identical to the direction in FIG. 7 in a case where the height is h2 (<h1). As illustrated in FIGS. 18A to 18D, the measurement apparatus 10a has a condensing lens 66 which condenses the reflected light RF toward the second light receiver 64.

Meanwhile, in a case where no condensing lens 66 exists, the light receiving spots S on the light receiving surface V of the second light receiver 60 are distributed as illustrated in FIGS. 19A and 19B according to the height of the surface of the object OB, as described above. In addition, in FIGS. 19A and 19B, according to four reflected lights RF, the light receiving spots S also include four light receiving spots S1 to S4. However, FIG. 19A illustrates the light receiving spots S1 to S4 in a case where the height is h1, and FIG. 19B illustrates the light receiving spots S1 to S4 in a case where the height is h2. In the present example, since h1>h2, the positions of the light receiving spots S1 to S4 on the X-axis illustrated in FIG. 19A are positioned at a more plus side in the X-axis direction than the positions of the light receiving spots S1 to S4 on the X-axis illustrated in FIG. 19B. In addition, FIGS. 19A and 19B illustrate an example in which nine light receiving elements, which are elongated in the Y-axis direction, are provided as the light receiving elements of the second light receiver 60.

Here, referring to FIGS. 9A and 9B, because the reflected light RF from the light emitting element 12 has an area in the Y-axis direction, the light receiving element, which is elongated in the Y-axis direction, needs to be disposed on the second light receiver 60 as illustrated in FIGS. 19A and 19B. However, as illustrated in FIGS. 9A and 9B, the optical paths of the reflected lights RF1 to RF4 according to the sequential light emission of the light emitting elements 12 are always identical to each other, and thus the positions on the second light receiver 60 when viewed in the direction in FIGS. 9A and 9B are also identical to each other. That is, when viewed in the direction illustrated in FIGS. 18A and 18B, the light receiving spots on the second light receiver do not have information about the height h. Because the CPU 100 of the controller 20 recognizes which light emitting element 12 is caused to emit light, the CPU 100 recognizes in advance a relationship between the light emission from the respective light emitting elements 12 and the light receiving spots on the second light receiver 60 according to the light emission. Therefore, the reflected lights RF1 to RF4 may be condensed in the Y-axis direction, and may enter the second light receiver 60.

As illustrated in FIGS. 18A to 18D, the measurement apparatus 10a is provided with the condensing lens 66 in consideration of the aforementioned points. That is, a lens, which has a power (light condensing operation) in the Y-axis direction as illustrated in FIGS. 18A and 18B, but has no power in the X-axis direction as illustrated in FIGS. 18C and 18D, that is, a so-called semi-cylindrical lens (cylindrical lens), is used as the condensing lens 66.

FIGS. 19C and 19D illustrate the second light receiver 64 and the light receiving spots S1 to S4 in the measurement apparatus 10a. However, FIG. 19C illustrates the light receiving spots S1 to S4 in a case where the height is h1, and FIG. 19D illustrates the light receiving spots S1 to S4 in a case where the height is h2. Therefore, the positions of the light receiving spots S1 to S4 on the X-axis as illustrated in FIG. 19C are positioned at a more plus side in the X-axis direction than the positions of the light receiving spots S1 to S4 on the X-axis as illustrated in FIG. 19D. As illustrated in FIGS. 19C and 19D, because the light receiving spots S1 to S4 in the measurement apparatus 10a are substantially condensed to one point, the length of the second light receiver 64 in the Y-axis direction is shorter than that of the second light receiver 60. That is, the measurement apparatus 10a according to the present exemplary embodiment is finished by the second light receiver having a smaller size compared with the measurement apparatus 10 according to the aforementioned exemplary embodiment.

Third Exemplary Embodiment

Figure 20A:
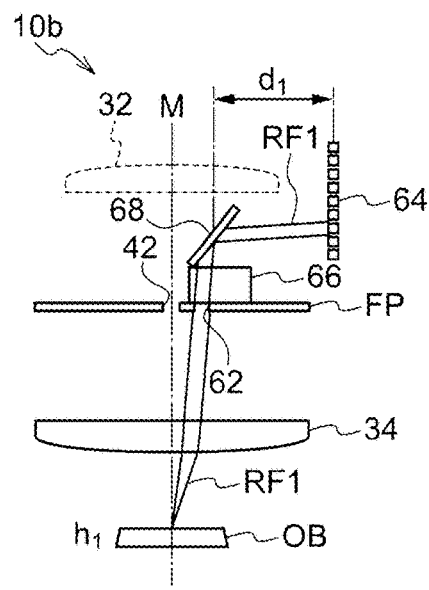
FIGS. 20A to 20D are views illustrating an example of a configuration of a measurement apparatus according to a third exemplary embodiment.
Figure 20B:
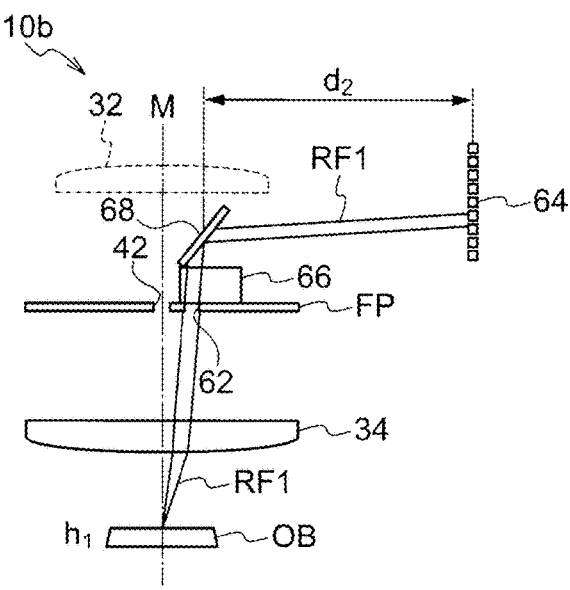
Figure 20C:
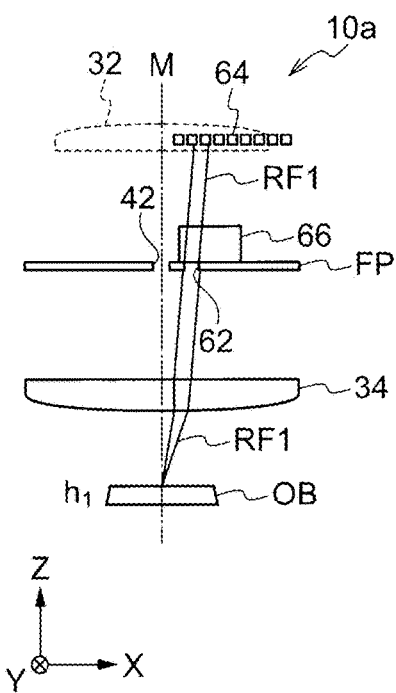
Figure 20D:
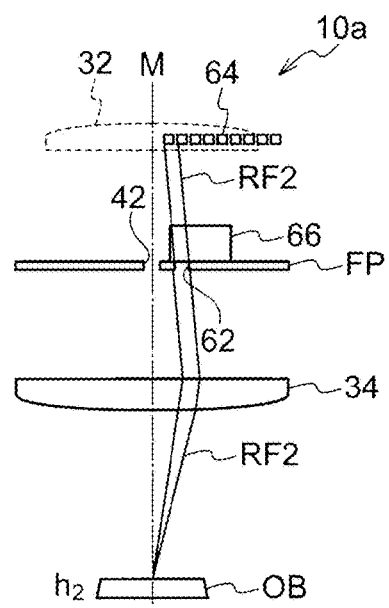

A measurement apparatus 10b according to the present exemplary embodiment will be described with reference to FIGS. 20A to 20D. The measurement apparatus 10b has a configuration in which a position of the second light receiver 64 is changed with respect to the measurement apparatus 10a according to the aforementioned exemplary embodiment, and interference between the second light receiver 64 and the irradiation light IF, or interference between the irradiation light IF and the reflected light RF is inhibited. FIGS. 20A and 20B illustrate the measurement apparatus 10b according to the present exemplary embodiment, and FIGS. 20C and 20D illustrate the measurement apparatus 10a in order to compare the measurement apparatus 10a with the measurement apparatus 10b. FIG. 20C illustrates a case in which the height of the surface of the object OB is h1, and FIG. 20D illustrates a case in which the height of the surface of the object OB is h2.

Here, in many cases, a shape of a cross section, which is perpendicular to a direction in which the reflected light RF runs, exhibits a Gaussian distribution (see FIG. 3B) in which light intensity is generally high in the vicinity of a central axis and is weakened toward the periphery of the central axis. For this reason, the greater the reflection angle θ is, the higher the light intensity of the reflected light RF is, that is, the closer the opening 62 is to the optical axis M, the higher the light intensity of the reflected light RF is. Therefore, as illustrated in FIGS. 20C and 20D, at a side where the opening 62 is located closest to the optical axis M (i.e., the opening 42), the light intensity of the reflected light RF is increased, and thus is hardly affected by noise (an S/N ratio is increased).

However, when the opening 62 is located closer to the optical axis M, the condensing lens 66 or the second light receiver 64 is located closer to the optical axis M or the lens 32 as illustrated in FIGS. 20C and 20D, and an end portion (end portion at a left side when viewed from a front side of the drawing sheet in FIGS. 20C and 20D) of the second light receiver 64 is easily interfered with the irradiation light IF (see FIG. 6) in the vicinity of the optical axis M. As apparent from the comparison between FIGS. 20C and 20D in view of the height h of the surface of the object OB, the lower the height h is, the easier the light is affected by the interference. That is, an incident position of the reflected light RF2 to the second light receiver 64 is closer to the optical axis M than an incident position of the reflected light RF1 to the second light receiver 64.

Therefore, in the measurement apparatus 10b according to the present exemplary embodiment, as illustrated in FIG. 20A, a mirror 68, which turns the reflected light RF1 in a direction in which the reflected light RF1 is moved away from the optical axis M, is provided, and the second light receiver 64 is spaced apart from the optical axis M. According to the change of optical path of the reflected light RF1, the disposition direction of the second light receiver 64 is changed from a direction in which the X-axis is a longitudinal direction to a direction in which the Z-axis direction is the longitudinal direction. In an example illustrated in FIG. 20A, a distance from the mirror 68 (e.g., an incident point of the reflected light RF1 to the mirror 68 in FIG. 20A) to the second light receiver 64 is d1. As a result, in the measurement apparatus 10b, interference between the reflected light RF and the irradiation light IF, or interference between an end portion of the second light receiver 64 and the irradiation light IF is inhibited.

FIG. 20B illustrates the measurement apparatus 10b in which a distance from the mirror 68 to the second light receiver 64 is d2, and the distance d2 is longer than the distance d1. As a result, as the distance from the mirror 68 to the second light receiver 64 becomes longer, the precision in measuring the height h of the surface of the object OB is enhanced. The reason is that as the distance from the mirror 68 to the second light receiver 64 becomes longer, an interval of the light receiving spot S according to the difference in height h is expanded, and resolution of the light receiving spot S, that is, resolution of the height h is increased.

In addition, in the present exemplary embodiment, descriptions have been made while exemplifying a configuration in which the mirror 68 is provided above the condensing lens 66. It should be noted that the invention is not limited thereto. The mirror 68 may be provided between the opening 62 and the condensing lens 66.

In addition, in the present exemplary embodiment, descriptions have been made while exemplifying a configuration which the condensing lens 66 and the mirror 68 are separately provided. It should be noted that the invention is not limited thereto. For example, the condensing lens 66 may be provided with a power that condenses the reflected light RF1 in a direction in which the reflected light RF1 is moved away from the optical axis M. As a result, the number of components is further reduced.

In the present exemplary embodiment, descriptions have been made while exemplifying a configuration in which the mirror 68 is provided in the measurement apparatus 10a. It should be noted that the invention is not limited thereto. The mirror 68 may be provided in the measurement apparatus 10.

Fourth Exemplary Embodiment

A measurement apparatus 10c according to the present exemplary embodiment will be described with reference to FIGS. 21A and 21B. The measurement apparatus 10c has a configuration in which a light blocking member 70 is provided in the measurement apparatus 10b according to the aforementioned exemplary embodiment. Therefore, because the components except for the light blocking member 70 are identical to those of the measurement apparatus 10b, the same components are designated by the same reference numerals, and detailed descriptions thereof will be omitted. In addition, descriptions have been made while exemplifying a configuration in which the light blocking member 70 is provided in the measurement apparatus 10b. Of course, the light blocking member 70 may be used for the measurement apparatus 10 or 10a according to the aforementioned exemplary embodiment.

Figures 21A, 21B:
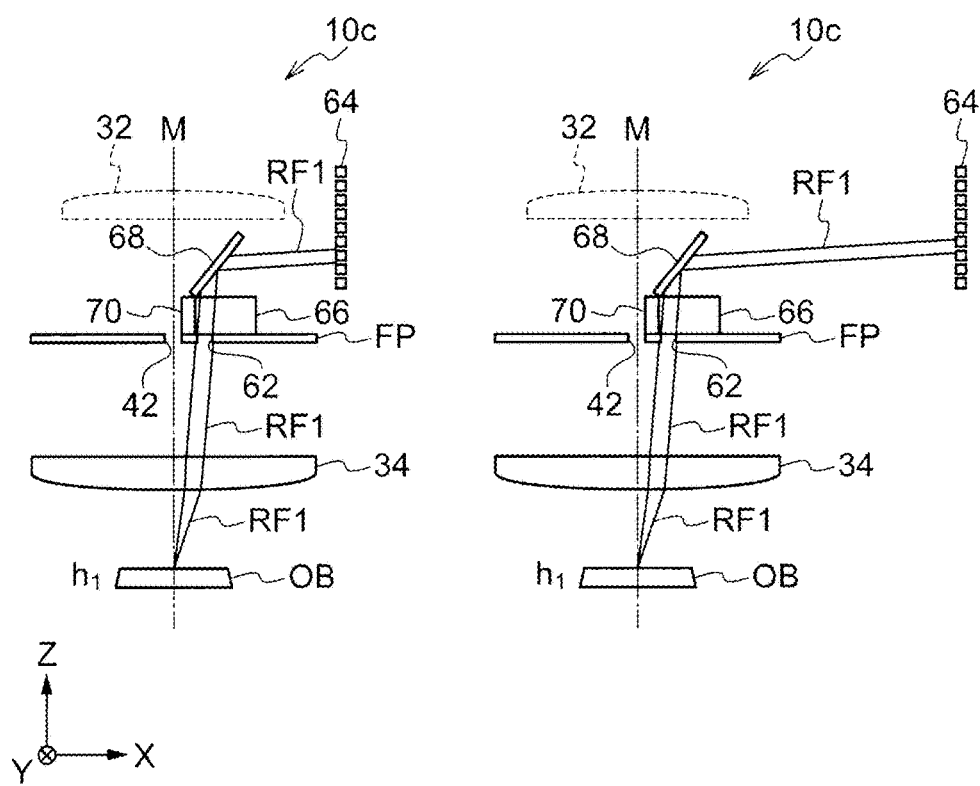
FIGS. 21A and 21B are views illustrating an example of a configuration of a measurement apparatus according to a fourth exemplary embodiment.

The measurement apparatus 10c illustrated in FIGS. 21A and 21B has a configuration in which the light blocking member 70 is provided in the measurement apparatus 10b illustrated in FIGS. 20A and 20B. In the measurement apparatus 10b illustrated in FIGS. 20A and 20B, there is a likelihood that an irradiation light IF (see FIGS. 6A to 6C) and a reflected light RF1 become stray light with respect to each other according to the position of the opening 62, and may leak into each other. Therefore, in the measurement apparatus 10c, the light blocking member 70 is provided at a point where there is a concern about stray light caused by the irradiation light IF or stray light caused by the reflected light RF. A configuration in which the light blocking member 70 is provided on the condensing lens 66 is exemplified in the measurement apparatus 10c illustrated in FIGS. 21A and 21B. It should be noted that the invention is not limited thereto. For example, the light blocking member 70 may be provided to cover the optical system configured with the condensing lens 66 and the mirror 68.

In each of the aforementioned exemplary embodiments, descriptions have been made while exemplifying a type in which the measurement apparatus serves to measure a condition of the surface of the object OB by the light receiver 18 and measure the height by the second light receiver 60 or 64. It should be noted that the invention is not limited thereto. For example, the measurement apparatus may serve only to measure the height. In this case, the measurement apparatus may have only the second light receiver 60 or 64 without having the light receiver 18.

In addition, in each of the aforementioned exemplary embodiments, descriptions have been made while exemplifying a configuration in which the object OB is moved when measuring the entire object OB or a part of the object OB. It should be noted that the present invention is not limited thereto. Since the light emitter 14 and the object OB may be moved relative to each other during the measurement of the entire object OB or apart of the object OB, the object OB may be fixed and the light emitter 14 may be moved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A measurement apparatus comprising:
    a light emitting unit that projects irradiation light to an object;
    a first lens that changes a divergence degree of the irradiation light emitted from the light emitting unit;
    an aperture stop unit that stops down the irradiation light projected from the first lens;
    a second lens that condenses the irradiation light passing through the aperture stop unit and projects the irradiation light to the object in a first direction;
    a transmission unit that is provided in a focal plane of the second lens and transmits therethrough a part of reflected light, which is generated as the irradiation light is projected to the object, reflected by the object, and transmitted through the second lens;
    a first light receiving unit that includes a light receiving surface that receives the part of the reflected light transmitted through the transmission unit; and
    a measurement unit that measures a height of a surface of the object by using a position of the part of the reflected light on the light receiving surface.

2. The measurement apparatus according to claim 1, wherein
    the aperture stop unit is formed with a first opening that is provided in the focal plane of the second lens to stop down the irradiation light, and
    the transmission unit is a second opening that is provided at a part of the aperture stop unit.

3. The measurement apparatus according to claim 1, wherein
    the light emitting unit includes a plurality of light emitting elements arranged in a second direction intersecting the first direction, and
    the measurement unit
        projects a plurality of the irradiation lights to different positions on the object by causing the plurality of light emitting elements to sequentially emit light, and
        measures a height distribution of the surface of the object in the second direction by using positions, on the light receiving surface, of a plurality of the reflected lights which are generated as the plurality of the irradiation lights are projected to the object, reflected by the object, and transmitted through the second lens.

4. The measurement apparatus according to claim 3, further comprising:
    a light condensing unit that is disposed between the transmission unit and the first light receiving unit and condenses the part of the reflected light in the second direction.

5. The measurement apparatus according to claim 3, further comprising:
    a moving unit that causes the object and the light emitting unit to move relative to each other in a third direction intersecting the first direction and the second direction, wherein
    the measurement unit measures the height distribution in the second direction while controlling the moving unit to move the object in the third direction.

6. The measurement apparatus according to claim 1, wherein
    the first lens and the second lens have a common optical axis and a common focal plane, and
    the aperture stop unit is disposed in the common focal plane.

7. The measurement apparatus according to claim 6, wherein
    the aperture stop unit is formed with a first opening that is provided at a position of the optical axis and that stops down the irradiation light,
    the measurement apparatus further comprising:
    a reflector that is disposed between the transmission unit and the first light receiving unit and that turns the part of the reflected light in a direction in which the part of the reflected light is moved away from the first opening.

8. The measurement apparatus according to claim 1, further comprising:
    a light blocking portion that is disposed between the transmission unit and the first light receiving unit and blocks the irradiation light and the reflected light.

9. The measurement apparatus according to claim 1, further comprising:
    a second light receiving unit that is disposed in the focal plane of the second lens and receives another part of the reflected light penetrated through the second lens, wherein
    the measurement unit further measures a condition of the surface of the object by using a light receiving result of the second light receiving unit.

* * * * *